(12) United States Patent
Russell et al.

(10) Patent No.: US 11,424,941 B2
(45) Date of Patent: Aug. 23, 2022

(54) METHOD AND SYSTEM FOR HANDLING DYNAMIC CYBERSECURITY POSTURE OF A V2X ENTITY

(71) Applicant: BlackBerry Limited, Waterloo (CA)

(72) Inventors: Nicholas James Russell, Newbury (GB); Stephen John Barrett, Haywards Heath (GB); Michaela Vanderveen, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 156 days.

(21) Appl. No.: 16/861,936

(22) Filed: Apr. 29, 2020

(65) Prior Publication Data
US 2021/0344513 A1    Nov. 4, 2021

(51) Int. Cl.
| | | |
|---|---|---|
| *H04L 29/06* | (2006.01) | |
| *H04L 9/32* | (2006.01) | |
| *H04L 9/40* | (2022.01) | |
| *H04W 4/40* | (2018.01) | |

(52) U.S. Cl.
CPC ........ *H04L 9/3268* (2013.01); *H04L 63/1425* (2013.01); *H04W 4/40* (2018.02); *H04L 2209/80* (2013.01); *H04L 2209/84* (2013.01)

(58) Field of Classification Search
CPC .............. H04L 9/3268; H04L 63/1425; H04L 2209/84; H04L 2209/80; H04W 4/40
See application file for complete search history.

(56) References Cited

U.S. PATENT DOCUMENTS

| | | | |
|---|---|---|---|
| 2014/0108787 A1* | 4/2014 | Ando .................... | H04L 9/3247 713/170 |
| 2018/0176209 A1* | 6/2018 | Narayanan ............ | H04W 48/10 |
| 2019/0028897 A1* | 1/2019 | Ying ..................... | H04W 12/75 |
| 2019/0268376 A1* | 8/2019 | Park ...................... | H04L 9/0819 |
| 2020/0106788 A1 | 4/2020 | Chen et al. | |
| 2020/0280842 A1* | 9/2020 | Liu ...................... | H04W 12/009 |
| 2020/0365013 A1* | 11/2020 | Simon ............... | G08G 1/096783 |
| 2021/0160323 A1* | 5/2021 | Nassor ............. | G08G 1/096783 |

OTHER PUBLICATIONS

PCT/US21/29709, International Search Report and Written Opinion, dated Sep. 15, 2021.

(Continued)

*Primary Examiner* — Joseph P Hirl
*Assistant Examiner* — Ka Shan Choy
(74) *Attorney, Agent, or Firm* — Moffat & Co

(57) ABSTRACT

A method at a network element, the method including receiving at least one message at the network element, the at least one message being one or both of: an update status information message from an updates server; and an anomaly detection status information message from anomaly detection server; determining, based on the receiving the at least one message, a dynamic cybersecurity posture indication for an intelligent transportation system entity; and providing the dynamic cybersecurity posture indication for the intelligent transportation system entity to an Enrolment Authority, wherein the dynamic cybersecurity posture indication can be included in a certificate relating to the intelligent transportation system entity.

21 Claims, 8 Drawing Sheets

(56) References Cited

OTHER PUBLICATIONS

IEEE 1609.2, "EEE Standard for WAVE—Security Services for Applications and Management Messages—Consolidated Draft of IEEE 1609.2-2016 with Amendments Specified in 1609.2a /D8 and 1609.2b / D3" Dec. 2016.

ETSI Technical Specification (TS) 103 097 "TS; Security; Security header and certificate formats" v1.3.1, Oct. 2017.

ETSI Technical Specification (TS) 102 941 "ITS; Security; Trust and Privacy Management", v1.2.1, May 2018.

ETSI Technical Specification (TS) 102 904 "Intelligent Transport Systems (ITS) Security, ITS Communications Security Architecture and Security Management", v. 1 2.1, Nov. 2016.

ETSI Technical Specification (TS) 102 940 "Intelligent Transport Systems (ITS); Security; ITS communications security architecture and security management" v1.3.1, Apr. 2019.

CAR2CAR Communication Consortium, "Protection profile V2X Hardware security module", Aug. 2018.

IETF Network Endpoint Assessment, "Request for Comment (RFC) 5209 Network Endpoint Assessment (NEA): Overview and Requirements" Jun. 2008.

PRESERVE, "PREparing SEcuRe VEhicle-to-X Communication Systems Deliverable 5.4", Jan. 31, 2016.

\* cited by examiner

METHOD AND SYSTEM FOR HANDLING DYNAMIC CYBERSECURITY POSTURE OF A V2X ENTITY

FIELD OF THE DISCLOSURE

The present disclosure relates to Vehicle to Everything (V2X) communications, and in particular relates to trust for V2X messages.

BACKGROUND

Intelligent Transport Systems (ITS) are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure, such as on bridges or at intersections, and for other users of the transportation systems including pedestrians or bicyclists.

ITS system deployment is receiving significant focus in many markets around the world, with radiofrequency bands being allocated for the communications. In addition to the vehicle to vehicle communications for safety critical and non-critical applications, further enhancements to provide systems or applications are being developed for vehicle to infrastructure and vehicle to portable scenarios.

However, when such devices communicate, a receiving device needs to be confident that the message received is trustworthy in order to act on the information within such message. One aspect of the problem that a receiving device faces in determining trustworthiness is whether the sending entity is cybersecure. In other words, the receiving entity needs to be confident that the sending entity has not been compromised or hacked. A compromised sending entity could be coerced into sending securely signed but illegitimate messages or data, which may be detrimental to the ITS system.

BRIEF DESCRIPTION OF THE DRAWINGS

The present disclosure will be better understood with reference to the drawings, in which.

DETAILED DESCRIPTION OF THE DRAWINGS

Figure 1:
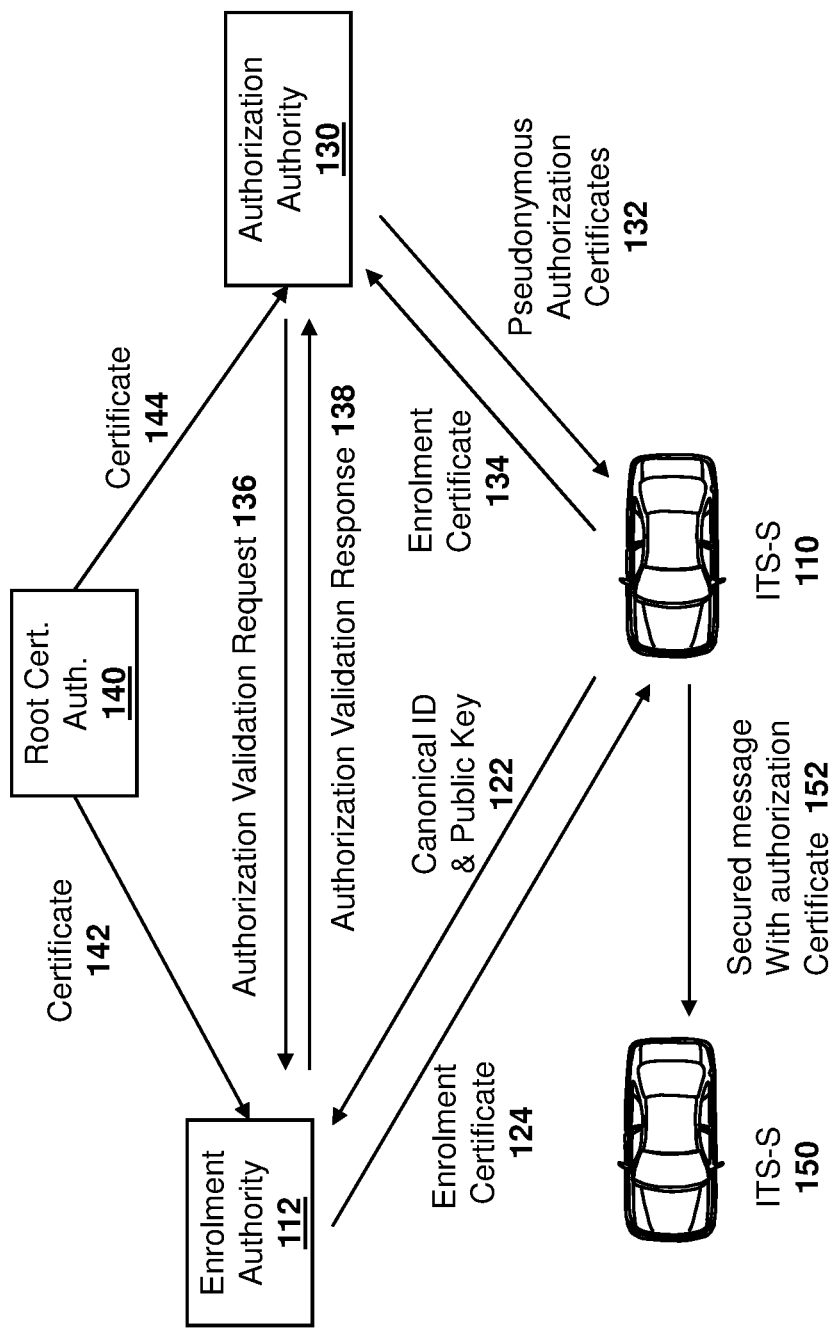
FIG. 1 is a block diagram showing an example public key infrastructure architecture for certificates in a V2X system.

The present disclosure provides a method at a network element, the method comprising: receiving at least one message at the network element, the at least one message being one or both of: an update status information message from an updates server; and an anomaly detection status information message from anomaly detection server; determining, based on the receiving the at least one message, a dynamic cybersecurity posture indication for an intelligent transportation system entity; and providing the dynamic cybersecurity posture indication for the intelligent transportation system entity to an Enrolment Authority, wherein the dynamic cybersecurity posture indication can be included in a certificate relating to the intelligent transportation system entity.

The present disclosure further provides a network element comprising: a processor; and a communications subsystem, wherein the network element is configured to: receive at least one message at the network element, the at least one message being one or both of: an update status information message from an updates server; and an anomaly detection status information message from anomaly detection server; determine, based on the receipt the at least one message, a dynamic cybersecurity posture indication for an intelligent transportation system entity; and provide the dynamic cybersecurity posture indication for the intelligent transportation system entity to an Enrolment Authority, wherein the dynamic cybersecurity posture indication can be included in a certificate relating to the intelligent transportation system entity.

The present disclosure further provides a computer readable medium for storing instruction code which, when executed by a processor of a network element cause the network element to: receive at least one message at the network element, the at least one message being one or both of: an update status information message from an updates server; and an anomaly detection status information message from anomaly detection server; determine, based on the receipt the at least one message, a dynamic cybersecurity posture indication for an intelligent transportation system entity; and provide the dynamic cybersecurity posture indication for the intelligent transportation system entity to an Enrolment Authority, wherein the dynamic cybersecurity posture indication can be included in a certificate relating to the intelligent transportation system entity.

In determining whether to act on a received V2X message, a V2X entity such as a vehicle receiving that message may need to determine whether or not it can trust the message. Trust of a message may vary based on the type of message. For example, safety critical use cases, such as an Emergency Brake Warning, where a receiving vehicle may need to determine whether or not it should act on the message contents and apply its brakes hard, possibly even in the absence of other corroborating information, may need a higher level of trust.

One aspect of the problem that a receiving V2X entity faces in determining trustworthiness is whether the sending V2X entity is cybersecure. In other words, determining trustworthiness may need to find that the sending V2X entity has not been compromised, sometimes referred to as "hacked".

In one case, a V2X entity implementation may consist of an operational software component and a separate secure key storage component, whereby if the former is compromised and the latter is not, for example because the latter has been engineered to be more robust/cybersecure, then the V2X entity could be coerced into sending securely signed illegitimate V2X messages/data.

Therefore, the present disclosure uses a cybersecurity posture to determine whether a sender or transmitter of a V2X message is trustworthy, where a "cybersecurity posture" is defined as the posture or integrity of a sender or transmitter of a V2X message from a cybersecurity perspective.

The present disclosure is related to V2X, which is a feature that provides for communication of information from a vehicle to other entities (and possibly also vice versa) that may affect the vehicle and/or the other entities. A V2X Entity is therefore an entity that supports one or both of sending V2X messages and receiving V2X messages, and can include Intelligent Transportation System (ITS) Stations (ITS-S), Electronic Control Units (ECUs), On-Board Units (OBUs), a User Equipment (UE), a Mobile Entity (ME), an End Entity (EE), among other options. A V2X Entity is also referred to as an ITS Entity herein, and the terms may be used interchangeably.

Communications to or from the vehicle may be to various V2X endpoints. A V2X endpoint may include: other vehicles, which alone may be referred to as Vehicle-to-Vehicle (V2V); infrastructure such as road-side units, which alone may be referred to as Vehicle-to-Infrastructure (V2I); pedestrians or cyclists, which alone may be referred to as Vehicle-to-Pedestrian (V2P); network(s), which alone may be referred to as Vehicle-to-Network (V2N); devices such as electronic devices within the vehicle, which alone may be referred to as Vehicle-to-Device (V2D); the electricity grid, which alone may be referred to as Vehicle-to-Grid (V2G); among other options. Together these are referred to as V2X.

V2X communications can be used for a variety of uses. In some cases, V2X may be used for both road safety and for improving efficiency of road transport, such as by reducing congestion or reducing fuel consumption.

Various systems/architectures can provide V2X communication. Cellular networks, such as those defined in the Third Generation Partnership Project (3GPP) set of specifications, is one such system/architecture. Other systems/architectures could include, for example, an Integrated Digital Enhanced Network (iDEN), the Institute of Electrical and Electronic Engineers (IEEE) 802.11p based wireless networks, among other options.

Generally, V2X communications consist of V2X messages sent from and received by V2X Entities. To protect V2X messages and the V2X system as a whole against rogue V2X Entities sending rogue messages, all V2X messages are integrity protected. Such integrity protection is realized by V2X Endpoints signing V2X messages before sending/broadcasting and including a certificate (also known as an Authorization Ticket) for the receiving V2X Endpoint to use to verify the signature. Thus, a V2X message consists of the data to be communicated, a signature of the data to be communicated, and a certificate.

The certificate contains data to verify that the signature is authentic, as well as other data. The data to verify that the signature is authentic may, for example, consist of a verification key, public key, or other such data. The signature included may follow the format defined in subclause 2.2.1 of IEEE 1609.2, *"IEEE Standard for WAVE—Security Services for Applications and Management Messages—Consolidated Draft of IEEE 1609.2-2016 with Amendments Specified in 1609.2a/D8 and 1609.2b/D3"*, December 2016.

A V2X Entity can obtain certificates to use in a V2X system by performing an enrolment, such as with an Enrolment Authority, followed by an authorization, for example with an Authorization Authority.

Reference is now made to FIG. 1, which provides an example overview of a European Telecommunications Standards Institute (ETSI) ITS Public Key Infrastructure, as for example defined in ETSI Technical Standard (TS) 102 904, *"Intelligent Transport Systems (ITS) Security, ITS Communications Security Architecture and Security Management"*, v. 1.2.1, November 2016.

In the example of FIG. 1, at the time of manufacture, a canonical identifier (ID), which is a an ID unique to each V2X Entity in a V2X system, is provided to the V2X Entity (e.g. ITS-S 110), and the same canonical ID is provided to the Enrolment Authority 112 alongside other information that is relevant to that canonical ID, such as an assurance level. This is for example described in ETSI TS 103 097 *"ITS; Security; Security Header and Certificate Formats"*, v1.3.1, October 2017 and in *ETSI TS* 102 941 *"ITS; Security; Trust and Privacy Management"*, v1.2.1, May 2018.

In the ITS architecture, an Enrolment Authority 112 authenticates an ITS-S 110 once it receives the Canonical ID and possibly other data (for example, a Public Key) 122 and grants it authorization to engage in ITS communications by issuing an Enrolment Certificate 124 (which may also be referred to herein as an Enrolment ID or Enrolment Credential). An Authorization Authority 130 provides an ITS-S 110 with authorization to use specific ITS services by providing temporary/pseudonym certificates 132 (known also as Authorization Tickets or Authorization Certificates) that can be used for these services. This authorization is based on the Enrolment Certificate 134, which is validated by the Enrolment Authority 112 using an Authorization Validation Request 136 and Authorization Validation Response 138. For example, ETSI TS 102 941 "ITS; Security; Trust and Privacy Management", v. 1.2.1, May 2018, describes Authorization Validation Request and Response messages. In particular, an AuthorizationValidationRequest message can include data such as a signed external payload and a shared attribute request. Such data may be signed and encrypted.

An Authorization ValidationResponse message may include the authorization validation response itself, which may be both signed and encrypted.

A Root Certificate Authority 140 may provide certificates 142 to Enrolment Authority 112 and certificates 144 to Authorization Authority 130.

ITS-S 110 may then communicate with other V2X endpoints, such as ITS-S 150, using messages secured with the authorization certificate 152.

Figure 2:
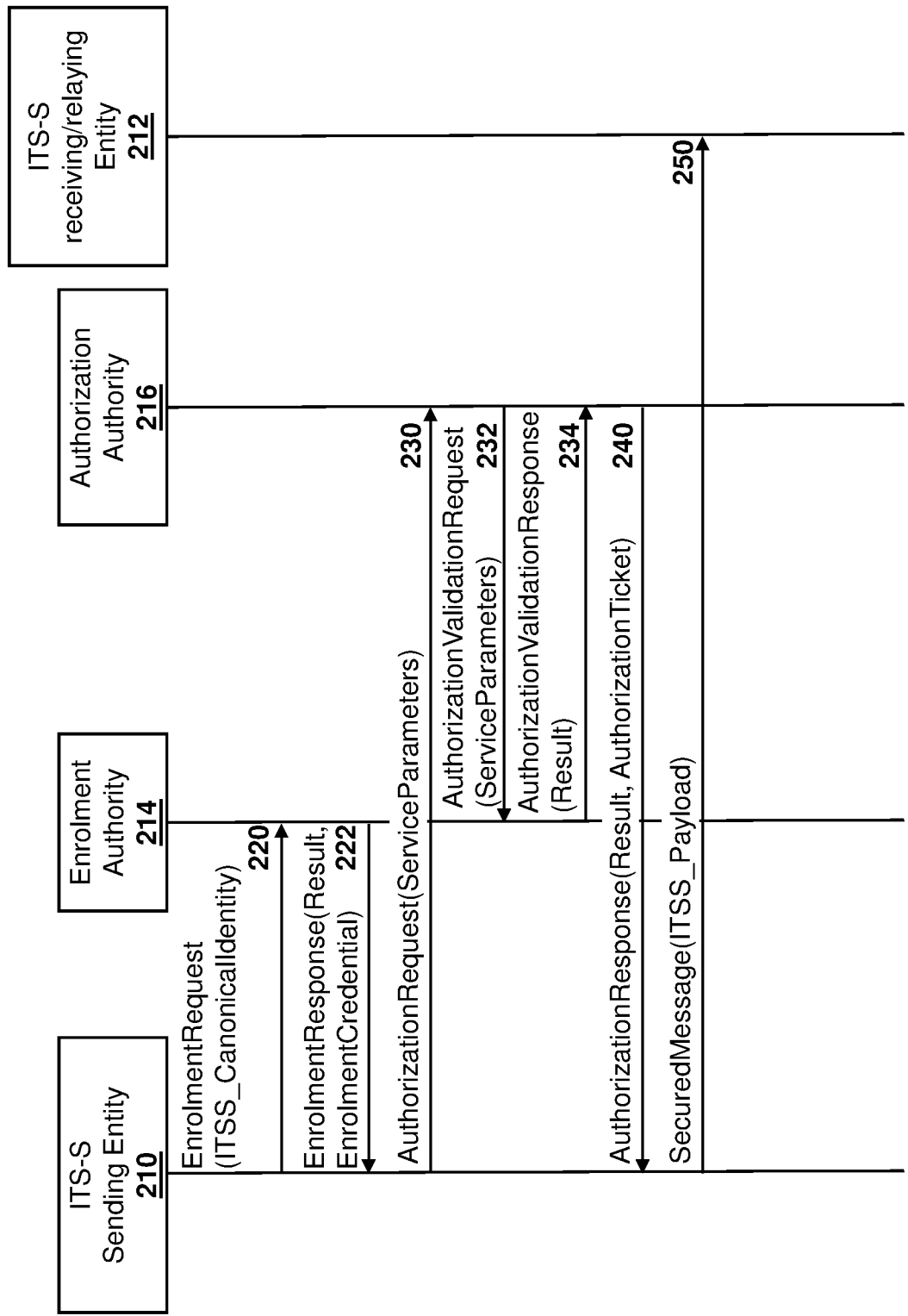
FIG. 2 is a dataflow diagram showing a certificate retrieval process in a V2X architecture.

An example for the messaging for the certificates is described with regards to FIG. 2. In the embodiment of FIG. 2, an ITS-S Sending Entity 210 wants to communicate with an ITS-S Receiving or Relaying Entity 212. First however, an enrolment credential must be received from an Enrolment Authority 214 and authorization ticket received from an Authorization Authority 216.

In this regard, the ITS-S Sending Entity 210 sends an EnrolmentRequest message 220 to the Enrolment Authority 214 and includes its Canonical ID and public key.

The Enrolment Authority 214 responds to the ITS-S Sending Entity 210 with an EnrolmentResponse message 222 and includes a result and enrolment credential.

The ITS-S Sending Entity 210 then requests certificates/Authorization tickets by sending an AuthorizationRequest message 230 to the Authorization Authority 216. Message 230 includes service parameters.

The Authorization Authority 216 sends an AuthorizationValidationRequest message 232 including the service parameters to the Enrolment Authority 214. The Enrolment Authority 214 responds to the Authorization Authority 216 with an AuthorizationValidationResponse message 234 with a result. Message 234 may further include an Assurance Level that applies. The Authorization Authority 216 may include the Assurance Level, if received, in the Authorization Tickets (also known as Pseudonym Certificates) that it produces. As used herein, Authorization Tickets could include the European Authorization Tickets or US Authorization Certificates, previously known as Pseudonym certificates.

These Authorization Tickets are provided by the Authorization Authority 216 to the ITS-S Sending Entity 210 in the Authorization Response message 240.

The ITS-S Sending Entity 210 can then send a V2X message, shown as SecuredMessage 250, to another ITS-S in the Intelligent Transportation System, such as ITS-S Receiving or Relaying Entity 212. The ITS-S Sending Entity 210, when wishing to send a V2X message, typically creates a V2X message that includes a certificate (Authorization Ticket) and a payload (e.g. vehicle current position, speed); computes a fixed length hash of the variable length V2X message, using a well-known hashing algorithm; signs the hash, using the ITS-S Sending Entity's private key; and appends the signature to the payload and sends the resulting V2X message.

Thus, the V2X message contains the message contents, a signed hash of the message, and a certificate. The message contents may, in accordance with ETSI TS 102 940, be protected for authenticity and integrity, and confidentiality and privacy. Therefore, the payload may but need not be encrypted.

The authorization ticket/certificate may include, amongst other things, the sending entity's pseudonymous identity; a signature block which is a hash of the sending entity's identity and the sending entity's public key that is signed by the Certificate Authority using the Certificate Authority's private key; the identity of the certificate authority which has signed the certificate; and an assurance level of the sending V2X Entity.

On receiving message 250, the ITS-S Receiving or Relaying Entity 212 will typically apply the Certificate Authority's well-known public key to the certificate's signature block to verify the identity of the sending entity and the public key of the sending entity.

The ITS-S Receiving or Relaying Entity 212 may then check that the identity is not on a list of identities (pointed to) in a Certificate Revocation List (CRL). If the sending entity's identity is on the CRL then the message may be discarded. The ITS-S Receiving or Relaying Entity 212 may perform other plausibility (non-cryptographic) checks and validity (cryptographic) checks.

The ITS-S Receiving or Relaying Entity 212 may then use the public key of the sending entity to verify the signature included in the V2X message.

As indicated above, the ITS-S Receiving or Relaying Entity 212 may check that the identity is not on the list of identities pointed to in a Certificate Revocation List (CRL). Receiving entities are typically configured with information to verify certificates such as root certificates. However, certificates can be revoked at any time, for example due to the receipt of a Misbehavior Report at a Misbehavior Authority.

Therefore, receiving entities may need to be able to detect or be configured with data that identifies revoked certificates such as a Certificate Revocation List (CRL). A CRL, in its basic form, is a list of digital certificates or indications of digital certificates, including hashes or "linkage seeds" in some cases, whom the Certificate Authority (CA) has decided to revoke before their expiration date/time. A CRL is produced by a Certificate Authority (which may also be a Misbehavior Authority) for the certificates under the CA's authority. These are distributed to, or fetched by, V2X Entities that need to handle certificates issued by that CA. CRLs are typically signed in order to provide integrity and authenticity of their content.

Entities receiving certificates check whether the received certificate is indicated in the CRL obtained from the certificate's Certificate Revocation Authority CA (CRACA) (each certificate contains an indication of its CRACA e.g. CracalD) as being revoked, and if so, should consider them and the data they are associated with, such as payload data in a V2X message, as untrustworthy.

As described above, only unexpired certificates are typically present on a CRL. In other words, once a certificate has expired, it no longer needs to be present on the CRL because entities receiving expired certificates will already treat such certificates as revoked.

CRLs can be distributed to an entity that needs them at any time, such as before the entity is expecting to start receiving certificates. However, the entity may need to fetch/obtain a new CRL when receiving a certificate that has a CRACA that identifies a CRL for which the entity has no CRL or has a CRACA that identifies a CRL that has already been obtained and that has either expired or has a "Next Update" field that has a value that occurs in the past.

While the above describes receiving V2X messages that are validated by a certificate, in some cases a Cybersecurity Assurance Level needs to also be conveyed. Various solutions for providing a Cybersecurity Assurance level are, for example, described in IEEE 1609.2; ETSI, the Internet Engineering Task Force (IETF) and the Car2Car consortium.

Specifically, the process defined in IEEE 1609.2 of obtaining an Enrolment certificate and then Application certificates (similar to "Authorization Tickets" and previously known as "pseudonym certs") is similar to that described in ETSI TS 103 097. An "assuranceLevel" item can be included in the IEEE 1609.2 certificate that is sent with the V2X message, where that certificate's corresponding private key is used to sign the V2X message.

For example, IEEE 1609.2 defines a ToBeSignedCertificate as including various fields such as the Id, cracalD, region, and assuranceLevel, among other fields. The assuranceLevel has a value defined as SubjectAssurance and is optional.

In ETSI TS 102 941, the process described above with regards to FIG. 2 applies. The Assurance Level attributed is a type of "Subject Assurance" as defined in IEEE 1609.2 and reused in ETSI-ITS. As described with regards to FIG. 2, a certificate or hash thereof is included with every V2X message that an ITS-S sends, and consequently the assurance level is also sent.

IETF, in a document entitled draft-tls-certieee1609-02.txt, "*Transport Layer Security (TLS) Authentication using ITS ETSI and IEEE certificates*", March 2018, considered a Trust Assurance Level (mandatory). Specifically, this draft stated: Trust Assurance Level (TAL): The C-ITS certificates of CAs and end-entities must contain a TAL: (1) For the security of a V2X communication system, assurance about the in-vehicle security of participants is vital: the receiver of a message has to be able to rely on the fact that the sender has generated the message correctly (i.e. the car sensors information is accurate and of integrity). Hence, a security breach on the sender would have an impact on all the receivers of a message; and (2) Only vehicles with a reasonable "level of security" should be able to obtain certificates from the PKI. The Car-to-Car Communication Consortium (C2C-CC) introduced different levels of trust, defined as Trust Assurance Levels and the authorization tickets (i.e. pseudonym certificates) of the vehicle must include the value of the vehicle TAL. Subsequent drafts do not contain this requirement.

The Car2Car consortium defines an Evaluation Assurance Level (EAL4) Common Criteria protection profile for the V2X Hardware Security Module (HSM) in Car2Car communication consortium, "*Protection profile V2X Hardware security module*", August 2018. Section 7.4.6 of the Car2Car consortium Basic Profile, "*C2C-CC Basic System profile*", August 2016, describes trust assurance for C2X stations. Highlights include that 5 trust levels are specified as Trust Assurance Level (TAL) 0 through TAL 4, where TAL 4 is highest Trust Assurance Level. A Minimal acceptable TAL for an ITS station is TAL 2. Each TAL is mapped to a Subject Assurance representation according to ETSI TS 103 097.

Further, a 2012 presentation at a Car2Car consortium/CAMP meeting had the following highlights: a receiver can be sure that the V2X message is not faulty based on the notion that a trusted party has evaluated the sending endpoint according to a well proven internationally accepted and trusted security standard and issues a certificate the receiver can verify about its opinion on how difficult it is to compromise this sender. The meeting further suggested that different TALs could be used for different applications, since if there is just one TAL level, it would have to be the one required by the most demanding application. This level may be a difficult level to achieve for all applications.

The Car2Car meeting considered options for a 'trusted international standard', including NIST FIPS-140-X, which dealt more with use of cryptography rather than a full-blown cybersecurity standard; ISO Common Criteria 3.1, which has limited durability (2 years), causing a problem and also being costly; and the CC adapted custom OEM C2X evaluation scheme. Also, the ISO/SAE 21434 Draft International Standard "Road vehicles—Cybersecurity engineering", February 2020, did not exist in 2012, but is described below.

An example of Trust Assurance Levels as defined by the C2C forum is shown in Table 1 below.

TABLE 1

| Trust Assurance Levels for C2X Stations | | | | | | |
|---|---|---|---|---|---|---|
| Trust ass. level TAL | Minimum Target of Evaluation (TOE) | Minimum Evaluation Assurance Level (EAL) | (Hardware) Security Functionality | Prevented Attacker acc. To CC | Security Implications | C2X use Case Examples |
| 0 | None | None | None | None | Not reliable against security attacks in general | Some limited e.g. using trusted C2I infrastructure |
| 1 | +C2X box software | EAL 3 | Only software security mechanisms | Basic | Not reliable against simple hardware attacks (e.g. offline flash manipulation) | Non-safety, but most privacy relevant use cases |
| 2 | +C2X box (sec.) hardware | EAL 4 | +Dedicated hardware security (i.e. secure memory & processing); tamper evidence | Enhanced Basic | Not reliable against more sophisticated hardware attacks (e.g. side-channel attacks) | C2C-CC day one use cases (e.g. passive warnings and helpers) |
| 3 | +tamper-protected (sec.) hardware | EAL 4+ (AVA_VAN.4 vulnerability resistance) | +Basic tamper resistance | Moderate | C2X box secure as stand-alone device, but without trustworthy in-vehicle inputs | Safety relevant relying not only on V2X inputs |
| 4 | +relevant in-vehicle sensors and ECUs | EAL 4+ (AVA_VAN.5 vulnerability resistance) | +moderate-high tamper resistance | Moderate-High | C2X box is trustworthy also regarding all relevant in-vehicle inputs. | All |

In Table 1 above, TAL 2 is the minimum acceptable level.

Another example of an assurance level is with regard to PRESERVE. PRESERVE is a European Community funded project on security and privacy aspects of vehicle to everything communications. Highlights from Section 2.5 of 'PRESERVE' (7th framework program funded by the EC-DG INFSO), January 2016, 'Preparing Secure Vehicle to X communication systems', Deliverable 5.4, Deployment Issues report, includes that: only vehicles with a reasonable level of security should be able to receive certificates from the C2X PKI; an entity (e.g. certification type company/industry consortium/self-signing by OEM) should be able to verify that a V2X module has met a minimum-security level; successful evaluation and certification could be the basis for an Enrolment Authority to issue enrolment credentials to vehicles; and TALs should be included in the authorization tickets (pseudonym certs) of vehicles.

In a further example, the ISO/SAE 21434 draft international standard (DIS) provides for Cybersecurity Assurance Levels (CALs) as defined in Table 2 below.

TABLE 2

ISO/SAE 21434 Cybersecurity Assurance Levels

| Level | Description | Philosophy | Difference from Previous Level |
|---|---|---|---|
| CAL 1 | Developers or users require a low to moderate level of independently assured cybersecurity. | Functionally and structurally tested. | Requiring developer testing, and a vulnerability analysis. |
| CAL 2 | Developers or users require a moderate level of independently assured cybersecurity and require a thorough investigation of the item without substantial reengineering. | Methodically tested and checked. It provides assurance through the use of development environment controls. | Procedures that provide moderate confidence that the item will not be tampered with during development. |
| CAL 3 | Developers or users require a moderate to high level of independently assured cybersecurity in conventional commodity items and are prepared to incur additional security-specific engineering costs. | Methodically designed, tested, and reviewed (resistance to penetration attackers with an enhanced-basic attack potential). | Requiring more design description, the implementation representation for the security functions, and improved mechanisms and/or procedures that provide confidence that the item will not be tampered with during development. |
| CAL 4 | Developers or users require the highest-level rigor. | Advanced methodically designed, tested, and reviewed. | Independent tested and reviewed (for example add an independent vulnerability analysis). |

Further, ISA/IEC 62443-3-3: "System Security Requirements and Security Levels" provides a framework to address and mitigate current and future security vulnerabilities for Industrial Automation and Control Systems (IACS). It defines a number of "Security Levels" (SLs) as follows:

SL 1: Protection against casual or coincidental violation

SL 2: Protection against intentional violation using simple means with low resources, generic skills and low motivation SL 3: Protection against intentional violation using sophisticated means with moderate resources, IACS specific skills and moderate motivation SL 4: Protection against intentional violation using sophisticated means with extended resources, IACS specific skills and high motivation Both CALs and SLs provide an indication of a security assurance based on the design and development of an entity. In each case, an entity's levels are static over time.

Cybersecurity Posture

As used herein, cybersecurity posture is a measure or a level of security/cybersecurity. The cybersecurity posture of an entity such as a piece of software, a piece of hardware, or a combination of hardware and software, is dynamic in nature and is typically considered to decrease over time due to such considerations as the probability over time of the entity becoming compromised. This decrease over time may also be referred to as a "window of opportunity". The decrease over time of cybersecurity posture is typically unpredictable and therefore can be non-linear. An increase in cybersecurity posture to an entity can occur too, and typically occurs when an update is made to the entity or to a component of the entity such as a software and/or hardware component.

Figure 3:
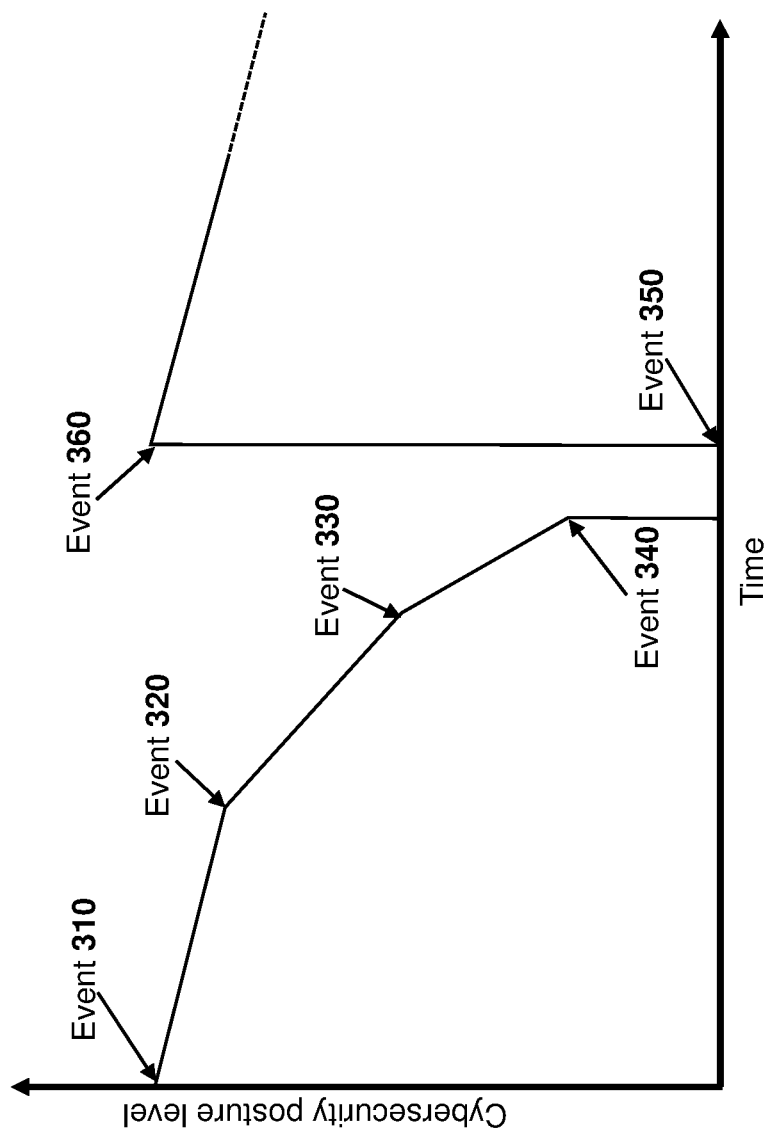
FIG. 3 is a plot showing cybersecurity levels over time based on event occurrences.

For example, reference is now made to FIG. 3, which depicts an example cybersecurity posture of an entity over time, where certain example events occur.

At Event 310, which is at time 0 (for example when an entity has completed development and verification, and is then deployed, perhaps to an end user), the cybersecurity posture of the example entity is considered a high level.

Between Event 310 and Event 320 the cybersecurity is considered to be decreasing at a steady rate due to the probability increasing over time for the entity being successfully hacked/compromised using one or more unknown vulnerabilities. This again may be referred to as the "window of opportunity".

At Event 320, a vulnerability is discovered and made known. However, this vulnerability is not yet a proven vulnerability.

Between Event 320 and Event 330 the cybersecurity posture may be considered to decrease more rapidly than between Event 310 and 320 due to the probability of both the known vulnerability being successfully used and also one or more unknown vulnerabilities being used to compromise the entity.

At Event 330, the known vulnerability is proven and/or detected as being used in another similar entity.

Between Event 330 and 340 the cybersecurity posture may be considered to decrease more rapidly than between Event 320 and 330, and also between Event 310 and 320, due to the probability of the known, proven vulnerability being successfully used and also one or more unknown vulnerabilities being used to compromise the entity.

At Event 340, the entity is hacked or compromised. This may, for example, be by an attacker successfully using the known vulnerability, or by an attacker successfully using an unknown vulnerability.

Between Event 340 and Event 350 the cybersecurity posture is considered low or insecure due to the successfully hack or compromise at Event 340.

At Event 350 a hardware and/or software update is made to the entity, or a component of the entity, which mitigates or addresses the known vulnerability. The update immediately restores the cybersecurity posture of the entity to its original level at Event 360.

After Event 360, the cybersecurity posture is considered decreasing at a steady rate again due to the probability increasing over time for the entity being successfully hacked or compromised using one or more unknown vulnerabilities, until such time as another event occurs.

Therefore, based on the example of FIG. 3, the cybersecurity posture of an entity is not static, but rather changes over time as events occur.

Based on the above, the Events can include updates and/or anomaly detection. Specifically, endpoints such as a V2X Entity can receive updates from an entity in a network including an Updates Server. Updates may consist of firmware and/or software updates, which may be applied to one or more of a V2X entity, an ITS-S, an OBU, an ECU, an infotainment system, an electronic instrument cluster, a digital instrument panel, a digital dash, a component of a vehicle, a system within a vehicle, a UE (User Equipment), amongst other options. Such updates could be downloaded by an endpoint, or uploaded to an endpoint, via a variety of different mediums, including wired connections or wireless connections. Wired connections may include but are not limited to Universal Serial Bus (USB), Ethernet, RS-232, electric charging connections, among others. Wireless connections can include, but are not limited to, a cellular connection, Wi-Fi, wireless charger, Bluetooth, among other options.

Example update solutions include those provided by the Open Mobile Alliance (OMA) Device Management (DM) specifications and those provided by the UPTANE Alliance as "Uptane Standard for Design and Implementation", among others. The receiving and installation of a software update by an endpoint may improve or mitigate vulnerabilities in the endpoint and therefore improve or increase its cybersecurity posture.

Furthermore, solutions exist within in the V2X industry for endpoint anomaly detection, which may include sending data to a network entity for the network entity to determine anomalies in the endpoint. Example anomaly solutions include those provided by Internet Engineering Task Force (IETF) Network Endpoint Assessment (NEA), among others.

One network entity may be referred to as an Anomaly Detection Server. An anomaly that is detected by such server to exist in an endpoint may imply that the endpoint has been hacked or compromised. In other words, the cybersecurity posture of the endpoint is low or is broken or has been adversely affected. Such a situation may occur, for example, due to a vulnerability in the endpoint being exploited by an attacker.

The endpoint may be assessed, for example, in accordance with IETF Network Endpoint Assessment, Request for Comment (RFC) 5209, "Network Endpoint Assessment (NEA): Overview and Requirements". Specifically, the IETF has defined a system architecture and suite of protocols for Network Endpoint Assessment principally directed at enabling enterprise IT infrastructure to assess the cybersecurity posture of an endpoint that wishes to join the enterprise network, for purposes of network access control. In this case, the endpoint could be a laptop, a desktop computer, among other options. For example, such an endpoint might be quarantined until it has had its cybersecurity posture determined to be satisfactory. One example from IETF RFC 5209 is as follows:

NEA provides owners of networks (e.g., an enterprise offering remote access) a mechanism to evaluate the posture of a system. This may take place during the request for network access and/or subsequently at any time while connected to the network. The learned posture information can then be applied to a variety of compliance-oriented decisions. The posture information is frequently useful for detecting systems that are lacking or have out-of-date security protection mechanisms such as: anti-virus and host-based firewall software.

the intent of NEA is to assess these endpoints to determine their compliance with security policies so that corrective measures can be provided before they are exposed to those threats. For example, if a system is determined to be out of compliance because it is lacking proper defensive mechanisms such as host-based firewalls, anti-virus software, or the absence of critical security patches, the NEA protocols provide a mechanism to detect this fact and indicate appropriate remediation actions to be taken . . . .

NEA typically involves the use of special client software running on the requesting endpoint that observes and reports on the configuration of the system to the network infrastructure. The infrastructure has corresponding validation software that is capable of comparing the endpoint's configuration information with network compliance policies and providing the result to appropriate authorization entities that make decisions about network and application access . . . .

Architectures, similar to NEA, have existed in the industry for some time and are present in shipping products, but do not offer adequate interoperability. Some examples of such architectures include: Trusted Computing Group's Trusted Network Connect [TNC], Microsoft's Network Access Protection [NAP], and Cisco's Cisco Network Admission Control [CNAC]. These technologies assess the software and/or hardware configuration of endpoint devices for the purposes of monitoring or enforcing compliance to an organization's policy.

Other solutions in this technical field may also exist, and may be referred to herein as "endpoint attestation".

Based on the above, a dynamic cybersecurity posture is not accounted for in existing assurance levels conveyed in V2X messaging. Specifically, existing assurance levels in V2X messaging indicate only a static level, assumed to be valid for the lifetime of the V2X entity from which they are received.

However, as described with regards to FIG. 3, a cybersecurity posture for an endpoint may decrease over time. Therefore, in accordance with some of the embodiments of the present disclosure, a more dynamic mechanism that can better take into account the decrease over time of the degree of cybersecurity posture is provided. Such dynamic cybersecurity posture provides a more accurate measure of cybersecurity posture. Ensuring only those V2X entities that are deemed to have an acceptable degree of cybersecurity posture can participate in a V2X system helps ensure the correct functioning of the V2X system, and potentially lowers the number of misbehaving V2X entities in the V2X system.

Furthermore, there is currently no mechanism to determine the cybersecurity posture of a V2X entity and potentially also deny the allocation of new certificates to such a V2X entity if its cybersecurity posture is deemed unacceptable.

In accordance with further embodiments of the present disclosure, methods and systems are provided to remove a V2X entity from a V2X system due to newly detected poor cybersecurity posture. Specifically, when the cybersecurity posture of a V2X Entity decreases suddenly, such as when a new vulnerability/exploit or anomaly is identified and/or proven, or when an update to mitigate an exploit is made available, there is currently no defined mechanism to remove the V2X Entity whose cybersecurity posture has decreased from a V2X system until such time as the V2X Entity has been updated/patched/upgraded and can inform the V2X system of such.

These and other embodiments are described below. In the embodiments below, the examples are described in terms of the European Cooperative Credential Management System (CCMS). However, this is merely provided for illustration purposes and is not limiting. Similar concepts can be applied to any other types of Security Credential Management System (SCMS), including but not limited to the US Crash Avoidance Metrics Partners (CAMP) based SCMS system, the Chinese SCMS system, among other options.

Further, whilst all of the solutions below are focused on cybersecurity posture, such solutions can also apply to other disciplines or posture types, including but not limited to: functional safety; Safety of The Intended Functionality (SOTIF), amongst others.

Determining and Indicating a Trusted Dynamic Cybersecurity Posture

In accordance with one embodiment, methods and system are provided for determining and indicating a trusted dynamic cybersecurity posture and indicating V2X Entity updates needed when a V2X entity attempts to obtain V2X certificates. In this embodiment, a first V2X entity sends to a second V2X entity a V2X message that includes a certificate, wherein the certificate includes Dynamic Cybersecurity Posture Information (DCPI). Such V2X message may include, but is not limited to, a Basic Safety Message (BSM), a Cooperative Awareness Message (CAM), Collective Perception Message (CPM), among others.

The second V2X entity, upon receiving a certificate that includes a DCPI, may then take appropriate action depending on the DCPI. Such action could include discarding or ignoring the V2X message, applying brakes of a vehicle, showing an indication to a vehicle occupant (e.g. driver), among other actions. In this case, the second V2X entity trusts the value of the received DCPI because the DCPI is included in a certificate that has been signed by a CA that is trusted by the second V2X Entity. For example, the certificate may be signed by an Authorization Authority of the V2X system.

The second V2X entity may take appropriate action depending on a level of trustworthiness determined using the received DCPI. The second V2X entity may attribute a higher-level of trustworthiness to V2X messages containing a DCPI that contains a date/time stamp value whose value indicates recent dates and attribute a lower level of trustworthiness to V2X messages containing a DCPI that contains a date/time stamp value whose value indicates later/more distant dates.

For example, if a receiving V2X entity receives a first V2X message containing a DCPI with a date/time stamp field indicating a date/time of less than one month ago and also receives a second V2X message containing a DCPI with a date/time stamp field indicating a date/time of greater than one year ago, then the receiving V2X entity may assign a higher level of trustworthiness to the first V2X message compared to the second V2X message.

Alternatively, or in addition to the above, the second V2X entity may attribute a higher-level of trustworthiness to V2X messages containing a DCPI that contains a level of assurance or cybersecurity posture level of a certain value or within a certain range of values. For example, if a receiving V2X entity receives a first V2X message containing a DCPI with level of assurance or cybersecurity posture level indicating a level of assurance or cybersecurity posture level of less than or equal to a value of 4 and also receives a second V2X message containing a DCPI with a level of assurance or cybersecurity posture level indicating a level of assurance or cybersecurity posture level of greater than a value of 4, then the receiving V2X entity may assign a higher level of trustworthiness to the first V2X message compared to the second V2X message.

Obtaining Cybersecurity Posture Information about a V2X Entity

In order to obtain a cybersecurity posture, various entities will need to be trusted. The following entities are assumed to have trust relationships between them: V2X Entity and Updates Server; V2X Entity and Anomaly Detection Server; Updates Server and V2X Entity Cybersecurity Posture Determination Server (CPDS); and Anomaly Detection Server and V2X Entity CPDS.

Figure 4:
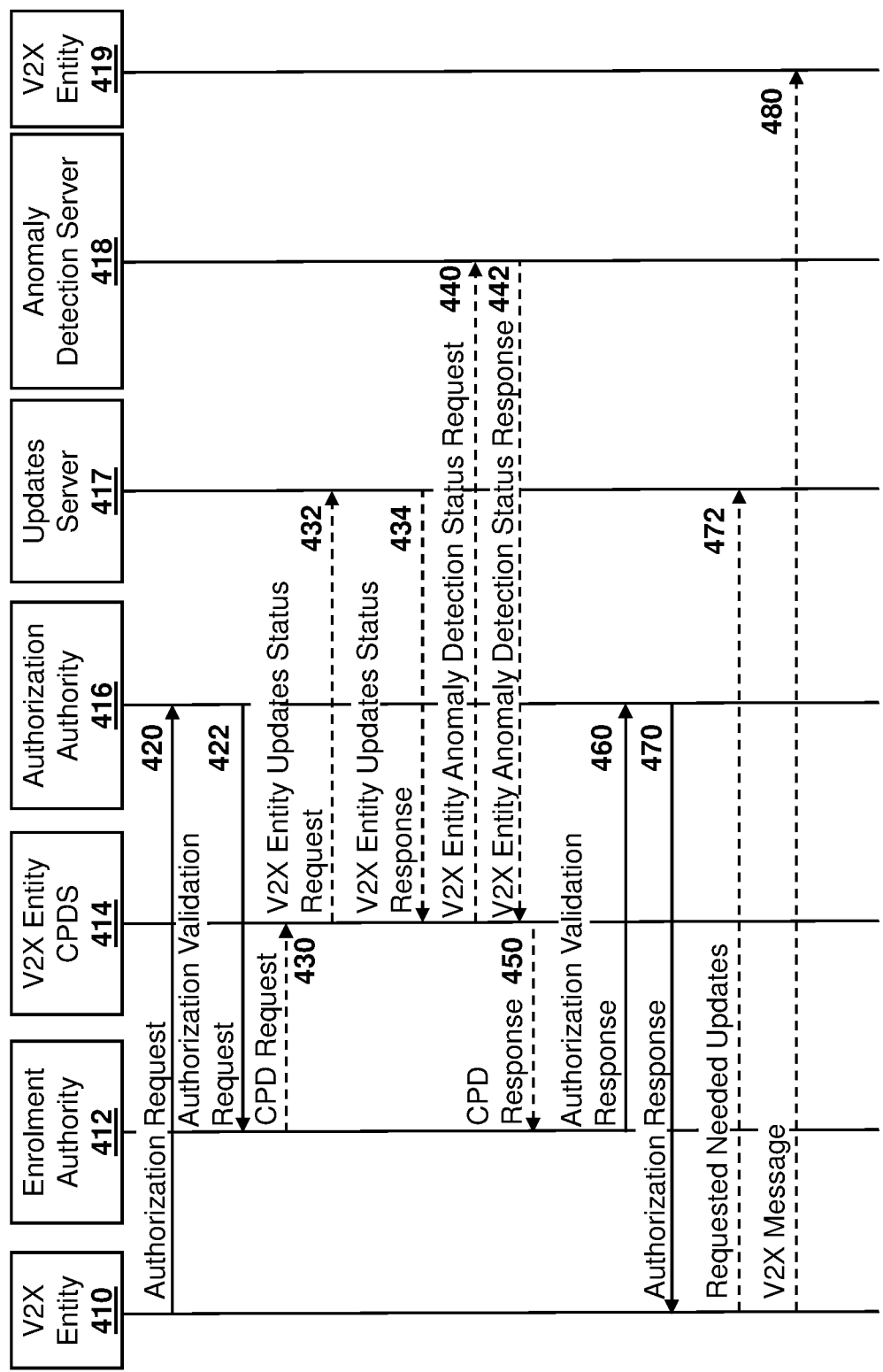
FIG. 4 is a dataflow diagram showing the determination and provision of a dynamic cybersecurity posture to a V2X entity.

Reference is now made to FIG. 4. In the embodiment of FIG. 4, a V2X entity 410 is shown along with other network entities, including an Enrolment Authority 412, a V2X Entity CPDS 414, an Authorization Authority 416, an Updates Server 417, an Anomaly Detection Server 418, and a second V2X Entity 419.

The embodiment of FIG. 4 shows a dataflow with messages shown in dashed lines indicating optional or conditional message flows.

In the embodiment of FIG. 4, V2X Entity 410 sends an Authorization Request 420 to the Authorization Authority 416. The Authorization Request 420 includes service parameters and may include Cybersecurity Data.

Upon receiving the Authorization Request 420, the Authorization Authority 416 sends an Authorization Validation Request message 422 to the Enrolment Authority 412. The Authorization Validation Request includes service parameters and may include the Cybersecurity Data if provided in the Authorization Request 420.

In a first embodiment, in response to receiving the Authorization Validation Request message 422, the Enrolment Authority 412 may retrieve, for example from a storage medium, or determine one or more of: a DCPI for V2X Entity 410; that no DCPI is determinable for V2X Entity 410; or that the Dynamic Cybersecurity Posture (DCP) of the V2X Entity 410 is too low for the V2X system. In this case, the determining may include using cybersecurity data associated with V2X Entity 410. For example, such cybersecurity data may have been received in the Authorization Validation Request message 422, retrieved from a database, or received from another entity such as directly from V2X entity 410, among other options.

As a result of such retrieving, in some cases the Enrolment Authority 412 may skip messages 430, 432, 434, 440, 442 and 450 described below, and proceed directly to message 460.

In one alternative scenario, the following steps may occur. In particular V2X Entity 410 may send (not shown) a message (e.g. Enrolment Request) to the Enrolment Authority 412, which includes Cybersecurity Data. The Enrolment Authority 412 receives the message and stores the received Cybersecurity Data or determines a DCPI for V2X Entity 410 or determines that no DCPI is determinable for V2X Entity 410, determines that DCP of V2X Entity 410 is too low for the V2X system, based on the received Cybersecurity Data. The Enrolment Authority may send a response message (e.g. Enrolment Response) to V2X Entity 410 and V2X Entity 410 receives the message (not shown).

In another embodiment, in response to receiving the Authorization Validation Request message 422, the Enrolment Authority 412 may send a Cybersecurity Posture Determination (CPD) Request message 430 to a V2X Entity CPDS 414. Message 430 may include Cybersecurity Data, which may be received in message 422, looked up in the database, received from another entity, among other options. Message 430 may further include an identity/identifier of V2X Entity 410 that identifies V2X Entity 410 to the Updates Server 417. Such identity may, for example, be a V2X Entity ID, an Updates Client ID, among other options. In other cases, the Enrolment Authority 412 may use an identity/identifier of V2X Entity 410 that identifies V2X Entity 410 to the V2X Entity CPDS 414, where such identity/identifier is not an identity/identifier used in the remaining V2X system order to enhance the privacy of V2X Entity 410.

In response to receiving CPD Request message 430, the V2X Entity CPDS 414 may do one of two things. In a first case, the V2X Entity CPDS may retrieve, for example from a storage medium, or determine one or more of: a DCPI for V2X Entity 410; that no DCPI is determinable for V2X Entity 410; or that the Dynamic Cybersecurity Posture (DCP) of the V2X Entity 410 is too low for the V2X system. In this case, the determining may include using Cybersecurity Data associated with V2X Entity 410. For example, such Cybersecurity Data may have been received in the CPD message 430, retrieved from a database, or received from another entity, among other options.

In a second case, the V2X Entity CPDS 414 may send a V2X Entity Update Status Request message 432 to Updates Server 417. Message 432 may include an identity/identifier of V2X Entity 410 that identifies V2X Entity 410 to the Updates Server 417. Such identity may, for example, be a V2X Entity ID, an Updates Client ID, among other options. In other cases, the V2X Entity CPDS 414 may use an identity/identifier of V2X Entity 410 that identifies V2X Entity 410 to the Updates Server 417, where such identity/identifier is not an identity/identifier used in the remaining V2X system in order to enhance the privacy of V2X Entity 410.

The Updates Server 417 may contain functionality to determine a V2X Entity from a received V2X Entity ID. For example, the Updates Server 417 may contain linkage seed values to determine a V2X entity from a received pseudonym certificate. Other options are possible.

In response to receiving the V2X Entity Updates Status Request message 432, Updates Server 417 sends a V2X Entity Updates Status Response message 434 back to the V2X Entity CPDS 414. Message 434 contains V2X Entity Updates Data associated with V2X entity 410. Characteristics of V2X Entity Updates Data are described below.

Updates Server 417 may retrieve information comprising V2X Entity Updates Data from a local storage, from another entity, or a combination of both.

Also, in response to receiving CPD Request Message 430, V2X Entity CPDS 414 may send a V2X Entity Anomaly Detection Status Request message 440 to the Anomaly Detection Server 418. Message 440 may include an identity/identifier of the V2X Entity 410 that identifies the V2X Entity 410 to the Anomaly Detection Server 418. Such identity may, for example, be a V2X Entity ID, an Anomaly Detection Client ID, among other options. In other cases, the V2X Entity CPDS 414 may use an identity/identifier of V2X Entity 410 that identifies V2X Entity 410 to the Anomaly Detection Server 418, where such identity/identifier is not an identity/identifier used in the remaining V2X system order to enhance the privacy of V2X Entity 410.

Further, the Anomaly Detection Server 418 may contain functionality to determine a V2X Entity from a received V2X Entity ID. For example, the Anomaly Detection Server 418 may contain linkage seed values to determine a V2X entity from a received pseudonym certificate. Other options are possible.

In response to receiving message 440, Anomaly Detection Server 418 sends a V2X Entity Anomaly Detection Status Response message 442 back to the V2X Entity CPDS 414. Message 442 contains the V2X Entity Anomaly Detection Data associated with V2X Entity 410, as described below. Anomaly Detection Server 418 may retrieve information comprising V2X Entity Anomaly Detection Data from a local storage, retrieve from another entity, or a combination of both.

In response to receiving one or both of messages 434 and 442, the V2X Entity CPDS 414 determines one or more of: a DCPI for V2X Entity 410; that no DCPI is determinable for V2X Entity 410; or that the DCP of V2X entity 410 is too low for the V2X system. The determining may include one or more of using the V2X Entity Updates Data received in message 434, the V2X Entity Anomaly Detection Data received in message 442 and using Cybersecurity Data associated with V2X Entity 410. Such Cybersecurity Data may have been received within CPD Request 430, may be looked up in a database, may be retrieved from another entity, among other options.

The V2X Entity CPDS 414 sends a CPD Response message 450 to the Enrolment Authority 412. Message 450 may contain one or more of: A DCPI; an indication indicating that no DCPI was determined (hereinafter referred to as "No DCPI Indication"); and an indication indicating that the DCP of V2X Entity 410 is too low for the V2X system (hereinafter referred to as "DCP Too Low Indication").

In response to the Enrolment Authority 412 receiving CPD Response 450, or based on the Enrolment Authority 412 retrieving or determining a DCPI, that no DCPI exists or that the DCPI is too low, the Enrolment Authority may send an Authorization Validation Response message 460 to Authorization Authority 416. Message 460 includes the DCPI, a No DCPI Indication and/or a DCP Too Low Indication as received in the CPD Response 450 or determined from the Authorization Validation Request 422.

Authorization Authority 416 receives message 460 and sends an Authorization Response 470, which may contain a result parameter, to V2X Entity 410. Response 470 includes the DCPI, a No DCPI Indication and/or a DCP Too Low Indication as retrieved by the Authorization Authority or as received in Authorization Validation Response message 460.

The DCPI, a No DCPI Indication and/or DCP Too Low Indication may be included in an authorization ticket/certificate, and/or the No DCP Indication and DCP Too Low Indication may be included as a value in a Result parameter.

If the V2X Entity 410 receives no DCPI (for example a DCPI is absent from one or more received certificates) or receives a DCPI that the V2X entity determines to indicate a low or poor DCP; receives a No DPI Indication; and/or receives a DCP Too Low Indication, then the V2X Entity 410 may send a Request Needed Updates message 472 to Updates Server 417. This may be done to initiate a download of V2X entity updates to improve/correct/enhance the DCP of V2X Entity 410.

In addition, or alternatively, V2X Entity 410 may provide an indication to an occupant of a vehicle that V2X entity updates are required. For example, this indication may be an audible sound, a lamp being lit on a dashboard, a message being displayed on display unit, an audible instruction through a speaker within the vehicle, or other indications on an infotainment system, dashboard or other signaling mechanism within the vehicle. This may, for example, signal to an occupant to begin an updates process.

Once the updates are performed, (for example based on the request 472, updates being initiated manually such as by an occupant of the vehicle), V2X Entity 410 may then repeat the messaging of FIG. 4 in order to re-attempt or retrieve/obtain new certificates to use in a V2X system.

If the V2X Entity 410 received a DCPI, for example within a certificate, then the V2X Entity 410 may send a V2X message 480 to V2X Entity 419 that includes the DCPI received within message 470. Such V2X message 480 may, for example, include a Basic Safety Message (BSM), Cooperative Awareness Message (CAM), Collective Perception Message (CPM), among other options.

In response to receiving the V2X message 480 including the DCPI, V2X Entity 419 may use the DCPI to determine a level of trustworthiness or integrity of the received V2X message, as described below. Upon the V2X Entity 419 determining a level of trustworthiness of the received V2X message 480, the V2X Entity 419 may then perform a specific action dependent on the determined level of trustworthiness of the received V2X message 480. For example, the V2X Entity 419 may process the V2X message, drop/ignore/silently discard the V2X message, perform an action in the vehicle associated with the V2X Entity such as displaying a warning to the user (such as a message or an icon), among other options, or perform some other action.

A level of trustworthiness (or cybersecurity posture or cybersecurity integrity) may be determined by any entity in a V2X system, including but not limited to a V2X Entity, a CPDS Server, an Enrolment Authority, an Authorization Authority, among other options.

The Updates Server may be an OMA DM server or an Uptane Server. The Anomaly Detection Server could be an IETF NEA Server, as for example defined in IETF RFC 5209. The V2X Entity CPDS may contain an IETF NEA client as for example defined in IETF RFC 5209. The V2X Entity 410 may contain an OMA DM client and/or UPTANE client functionality.

In some embodiments, the Authorization Authority 416 may comprise a Registration Authority and/or an Authorization Certificate Authority.

Further, one or more of the entities shown in FIG. 4 may be combined with one or more of each other. In addition, the dataflow depicted in FIG. 4 may be performed in a different order to that shown.

Further, the names of the messages shown in FIG. 4 are just example names and different message names could be used.

Figure 5:
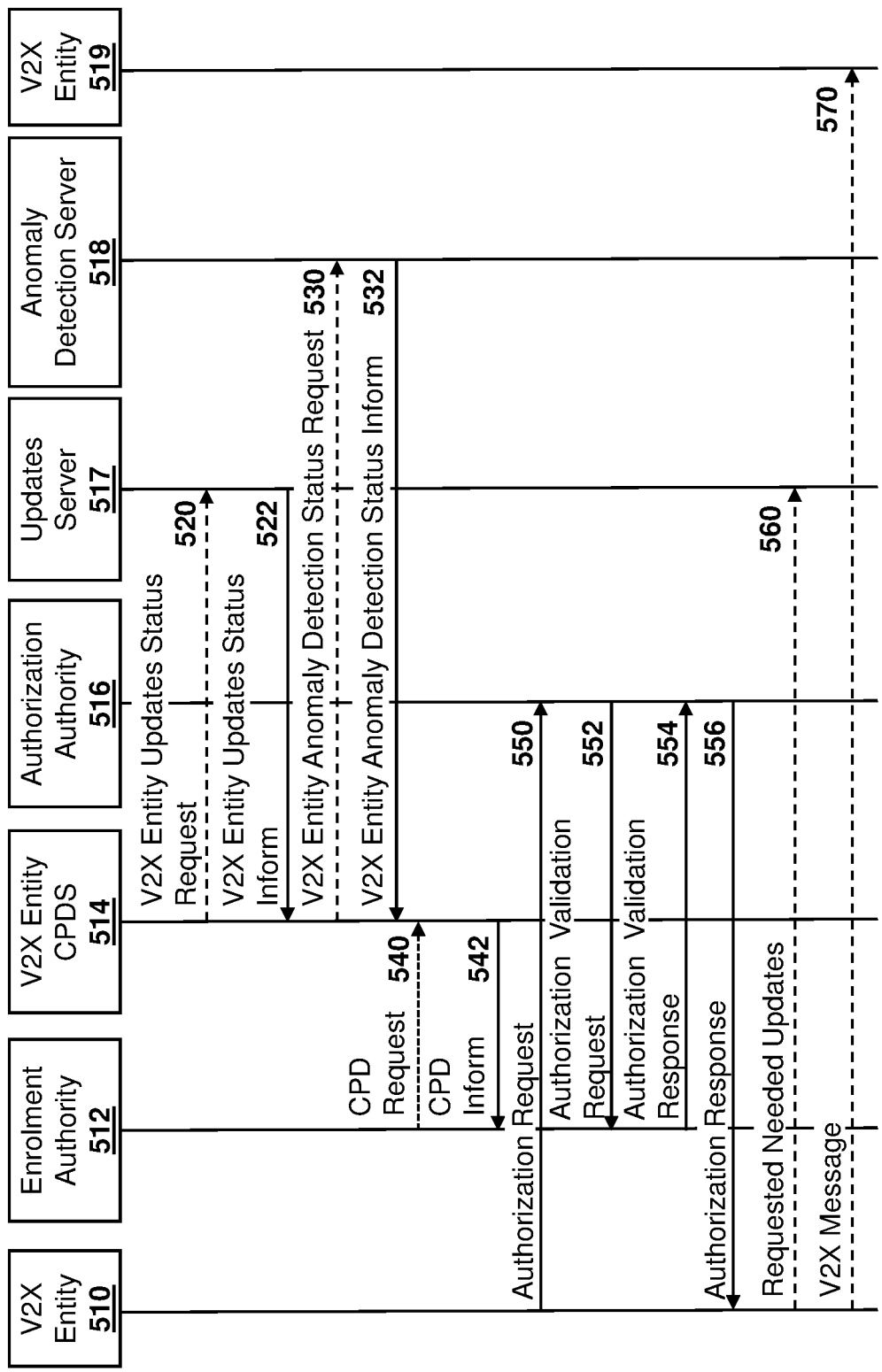
FIG. 5 is a dataflow diagram showing an alternative embodiment for the determination and provision of a dynamic cybersecurity posture to a V2X entity.

An alternative embodiment is shown with regard to FIG. 5. In particular, the embodiment of FIG. 5 shows a message flow between a V2X Entity 510, Enrolment Authority 512, V2X Entity CPDS 514, Authorization Authority 516, Updates Server 517, Anomaly Detection Server 518 and V2X Entity 519.

As with the embodiment of FIG. 4, dashed lines in the embodiment of FIG. 5 denote optional or conditional message flows.

In the embodiment of FIG. 5, a V2X Entity CPDS 514 may retrieve from storage medium or other storage, or may determine one or more of: a DCPI for V2X Entity 510; that no DCPI is determinable for V2X Entity 510; or that the DCP of V2X entity 510 is too low for the V2X system. The determining may include using Cybersecurity Data received in a message for V2X Entity 510 or looked-up in a database.

Alternatively, V2X Entity CPDS 514 may send a V2X Entity Update Status Request message 520 to Updates Server 517. Message 520 may include an identity/identifier of V2X Entity 510 that identifies V2X Entity 510 to the Updates Server 517. Such identity may, for example, be a V2X Entity ID, an Updates Client ID, among other options. In other cases, the V2X Entity CPDS 514 may use an identity/identifier of V2X Entity 510 that identifies V2X Entity 510 to the Updates Server 517, where such identity/identifier is not an identity/identifier used in the remaining V2X system order to enhance the privacy of V2X Entity 510.

The Updates Server 517 may contain functionality to determine a V2X Entity from a received V2X Entity ID. For example, the Updates Server 517 may contain linkage seed values to determine a V2X entity from a received pseudonym certificate. Other options are possible.

Updates Server 517 may send a V2X Entity Updates Status Inform message 522 to the V2X Entity CPDS 514. Message 522 may be in response to receiving the V2X Entity Updates Status Request message 520 in some cases, but does not have to be. Message 522 contains V2X Entity Updates Data associated with V2X entity 510. Characteristics of V2X Entity Updates Data are described below.

Updates Server 517 may retrieve information comprising V2X Entity Updates Data from a local storage, from another entity, or a combination of both.

V2X Entity CPDS 514 may also send a V2X Entity Anomaly Detection Status Request message 530 to the Anomaly Detection Server 518. Message 530 may include an identity/identifier of the V2X Entity 510 that identifies the V2X Entity 510 to the Anomaly Detection Server 518. Such identity may, for example, be a V2X Entity ID, an Anomaly Detection Client ID, among other options. In other cases, the V2X Entity CPDS 514 may use an identity/identifier of V2X Entity 510 that identifies V2X Entity 510 to the Anomaly Detection Server 518, where such identity/identifier is not an identity/identifier used in the remaining V2X system in order to enhance the privacy of V2X Entity 510.

Further, the Anomaly Detection Server 518 may contain functionality to determine a V2X Entity from a received V2X Entity ID. For example, the Anomaly Detection Server 518 may contain linkage seed values to determine a V2X entity from a received pseudonym certificate. Other options are possible.

Anomaly Detection Server 518 sends a V2X Entity Anomaly Detection Status Inform message 532 to the V2X Entity CPDS 514. Message 532 may be sent in response to receiving message 530 in some cases, but may be sent without message 530 in other cases.

Message 532 contains the V2X Entity Anomaly Detection Data associated with V2X Entity 510, as described below. The V2X Entity Anomaly Detection Data may also contain an identity/identifier of V2X Entity 510 that identifies V2X Entity 510 to the Anomaly Detection Server 518. Anomaly Detection Server 518 may retrieve information comprising V2X Entity Anomaly Detection Data from a local storage, retrieve from another entity, or a combination of both.

The Enrolment Authority 512 may optionally send a CPD Request message 540 to a V2X Entity CPDS 514. Message 540 may include Cybersecurity Data, which may have been looked up in a database, received in a message from another entity such as V2X Entity 510, among other options. Message 540 may further include an identity/identifier of V2X Entity 510 that identifies V2X Entity 510 to the V2X Entity CPDS 514. Such identity may, for example, be a V2X Entity ID, an Updates Client ID, an Anomaly Detection Client ID, among other options. In other cases, the Enrolment Authority 512 may use an identity/identifier of V2X Entity 510 that identifies V2X Entity 510 to the V2X Entity CPDS 514, where such identity/identifier is not an identity/identifier used in the remaining V2X system order to enhance the privacy of V2X Entity 510.

If the Enrolment Authority 512 determines one or more of a DCPI for V2X Entity 510, that no DCPI is determinable for V2X Entity 510, or that DCP of V2X Entity 510 is too low for the V2X system, where the determining included using Cybersecurity Data associated with V2X Entity 510 received in a message from another entity where the another entity is V2X Entity 510, then in one alternative scenario, the following steps may occur. In particular V2X Entity 510 may send (not shown) a message (e.g. Enrolment Request) to the Enrolment Authority 512, which includes Cybersecurity Data. The Enrolment Authority 512 receives the message and stores the received Cybersecurity Data or determines a DCPI for V2X Entity 510 or determines that no DCPI is determinable for V2X Entity 510, determines that DCP of V2X Entity 510 is too low for the V2X system, based on the received Cybersecurity Data. The Enrolment Authority may send a response message (e.g. Enrolment Response) to V2X Entity 510 and V2X Entity 510 receives the message (not shown).

In response to receiving one or more of messages 522, 532 and 540, the V2X Entity CPDS 514 determines one or more of: a DCPI for V2X Entity 510; that no DCPI is determinable for V2X Entity 510; or that the DCP of V2X entity 510 is too low for the V2X system. The determining may include one or more of using the V2X Entity Updates Data received in message 522, the V2X Entity Anomaly Detection Data received in message 532, and using Cybersecurity Data associated with V2X Entity 510. Such Cybersecurity Data may have been received within CPD Request 540, may be looked up in a database, may be retrieved from another entity, among other options.

The V2X Entity CPDS 514 sends a CPD Inform message 542 to the Enrolment Authority 512. Message 542 may contain one or more of: A DCPI; a "No DCPI Indication"; and a "DCP Too Low Indication".

When Enrolment Authority 512 receives message 542 it may store one or more of the received DCPI, No DCPI Indication, and DCP Too Low Indication.

V2X Entity 510 sends an Authorization Request 550 to the Authorization Authority 516. The Authorization Request 550 includes service parameters, and may include Cybersecurity Data.

Upon receiving the Authorization Request 550, the Authorization Authority 516 sends an Authorization Validation Request message 552 to the Enrolment Authority 512. The Authorization Validation Request includes service parameters and may include the Cybersecurity Data if provided in the Authorization Request 550.

Enrolment Authority 512 retrieves, for example from a storage, one or more previously stored DCPI, No DCPI Indication, and DCP Too Low Indication. The Enrolment Authority 512 may use Cybersecurity Data, if available, to verify the one or more previously stored DCPI, No DCPI Indication, and DCP Too Low Indication, for example to determine if they are still valid. If the verification fails, such as if the previously stored Indications are determined to no longer be valid, then the Enrolment Authority 512 may send CPD Request 540 and may receive CPD Inform 542 as described above, or may perform one or more of the messages 430, 432, 434, 440, 442 and 450 from FIG. 4.

Enrolment Authority 512 sends Authorization Validation Response message 554 to Authorization Authority 516, which includes a DCPI, a No DCPI Indication and/or a DCP Too Low Indication.

Authorization Authority 516 receives message 554 and sends an Authorization Response 556, which may contain a Result parameter, to V2X Entity 510. Response 556 includes the DCPI, a No DCPI Indication and/or a DCP Too Low Indication as received in Authorization Validation Response message 554. The DCPI, a No DCPI Indication and/or DCP Too Low Indication may be included in an authorization ticket/certificate, and/or the No DCP Indication and DCP Too Low Indication may be included as a value in a Result parameter.

If the V2X Entity 510 receives no DCPI (for example a DCPI is absent from one or more received certificates) or receives a DCPI that the V2X entity determines to indicate a low or poor DCP; receives a No DPI Indication; and/or receives a DCP Too Low Indication, then the V2X Entity 510 may send a Request Needed Updates message 560 to Updates Server 517. This may be done to initiate a download of V2X entity updates to improve/correct/enhance the DCP of V2X Entity 510.

In addition, or alternatively, V2X Entity 510 may provide an indication to an occupant of a vehicle that V2X entity updates are required. For example, this indication may be an audible sound, a lamp being lit on a dashboard, a message being displayed on display unit, an audible instruction through a speaker within the vehicle, or other indications on an infotainment system, dashboard or other signaling mechanism within the vehicle. This may, for example, signal to an occupant to begin an updates process.

Once the updates are performed, (for example based on the request 560, updates being initiated manually such as by an occupant of the vehicle), V2X Entity 510 may then repeat the messaging of FIG. 5 in order to re-attempt or retrieve/obtain new certificates to use in a V2X system.

If the V2X Entity 510 received a DCPI, for example within a certificate, then the V2X Entity 510 may send a V2X message 570 to V2X Entity 519 that includes the DCPI received within message 570. Such V2X message 570 may, for example, include a Basic Safety Message (BSM), Cooperative Awareness Message (CAM), Collective Perception Message (CPM), among other options.

In response to receiving the V2X message 570 including the DCPI, V2X Entity 519 may use the DCPI to determine a level of trustworthiness or integrity of the received V2X message, as described below. Upon the V2X Entity 519 determining a level of trustworthiness of the received V2X message 570, the V2X Entity 519 may then perform a specific action dependent on the determined level of trustworthiness of the received V2X message 570. For example, the V2X Entity 519 may process the V2X message, drop/ignore/silently discard the V2X message, perform an action in the vehicle associated with the V2X Entity such as displaying a warning to the user (such as a message or an icon), among other options, or perform some other action.

A level of trustworthiness (or cybersecurity posture or cybersecurity integrity) may be determined by any entity in a V2X system, including but not limited to a V2X Entity, a CPDS Server, an Enrolment Authority, an Authorization Authority, among other options.

The Updates Server may be an OMA DM server or an Uptane server. The Anomaly Detection Server could be an IETF NEA Server, as for example defined in IETF RFC 5209. The V2X Entity CPDS may contain an IETF NEA client as for example defined in IETF RFC 5209. The V2X Entity 510 may contain an OMA DM client and/or Uptane client functionality.

In some embodiments, the Authorization Authority 516 may comprise a Registration Authority and/or an Authorization Certificate Authority.

Further, one or more of the entities shown in FIG. 5 may be combined with one or more of each other. In addition, the dataflow depicted in FIG. 5 may be performed in a different order to that shown.

Further, the names of the messages shown in FIG. 5 are just example names and different message names could be used.

Based on FIGS. 4 and 5, a first V2X entity may retrieve a certificate that includes the DCPI by sending a first message to an Authorization Authority and the Authorization Authority receives the first message. The first V2X entity may include in the first message data/information regarding its cybersecurity posture, referred to herein as "Cybersecurity Data". In some cases, the Cybersecurity Data may be determined by the V2X Entity using existing solutions, such as endpoint attestation as described in IETF RFC 5209, among other options.

In response to receiving the first message, the Authorization Authority sends a second message to an Enrolment Authority, which may include Cybersecurity Data, for example as received from the first V2X Entity, as determined by the Authorization Authority, among other options. In response to receiving the second message, the Enrolment Authority then either determines a DCPI for the first V2X Entity, such as by using the received cybersecurity data or sending a third message to a V2X Entity CPDS, which may include Cybersecurity Data that may be received from the Authorization Authority, as determined by the Enrolment Authority, among other options.

The Authorization Authority or the Enrolment Authority may determine a DCPI using the received Cybersecurity Data, such as received from the Authorization Authority, received from the V2X Entity, or as determined itself. The V2X Entity CPDS may determine a DCPI using one or more of: the received Cybersecurity Data as perhaps received from the Authorization Authority or Enrolment Authority, or as determined itself; V2X Entity Updates Data, which may be received from an Updates Server; and V2X Entity Anomaly Detection Data, which may be received from an Anomaly Detection Server.

The V2X Entity CPDS may obtain V2X Entity Updates Data by receiving a message from an Update Server and may obtain V2X Entity Anomaly Detection Data by receiving a message from an Anomaly Detection Server.

The Updates Server may send a message to the V2X Entity CPDS that contains V2X Entity Updates Data, which may be in response to receiving a request message. The Anomaly Detection Server may send a message to the V2X Entity CPDS that contains V2X Entity Anomaly Detection Data, which may be in response to receiving a request message.

The Authorization Server or the Enrolment Server or the V2X Entity CPDS may determine that no DCPI is determinable, for example if no information or not enough information is available, or the cybersecurity posture of the first V2X entity is determined to be too low for the V2X Entity to participate in a V2X system.

After determining a DCPI or determining that no DCPI is determinable or determining that the cybersecurity posture of the first V2X entity is too low for the V2X Entity to participate in a V2X system, the V2X Entity CPDS sends a message to the Enrolment Authority containing the determined DCPI, an indication that no DCPI could be determined and/or an indication that the cybersecurity posture of the first V2X entity is too low for the V2X Entity to participate in a V2X system. The message containing the determined DCPI, an indication that no DCPI could be determined and/or an indication that the cybersecurity posture of the first V2X entity is too low for the V2X Entity to participate in a V2X system may be sent by the V2X Entity CPDS in response to receiving a request message.

After determining a DCPI or determining that no DCPI is determinable or determining that the cybersecurity posture of the first V2X entity is too low for the V2X Entity to participate in a V2X system or receiving a message from the V2X Entity CPDS that contains a DCPI, an indication that no DCPI is determinable or an indication that the cybersecurity posture of the first V2X entity is too low for the V2X Entity to participate in a V2X system, the Enrolment Authority sends a response message to the Authorization Authority that includes the determined or received DCPI, indication that no DCPI could be determined and/or indication that the cybersecurity posture of the first V2X entity is too low for the V2X Entity to participate in a V2X system to the Authorization Authority.

After determining a DCPI or determining that no DCPI is determinable or determining that the cybersecurity posture of the first V2X entity is too low for the V2X Entity to participate in a V2X system or receiving a message from the V2X Entity CPDS or Enrolment Authority that contains a DCPI, an indication that no DCPI is determinable or an indication that the cybersecurity posture of the first V2X entity is too low for the V2X Entity to participate in a V2X system, the Authorization Authority then sends a response message to the first V2X Entity that includes the determined or received DCPI, indication that no DCPI could be determined and/or indication that the cybersecurity posture of the first V2X entity is too low for the V2X Entity to participate in a V2X system to the first V2X Entity.

The DCPI included in the response message to the first Authorization Authority and/or response message to the V2X Entity may be (and is preferred to be) included within an authorization ticket/certificate. The indication that no DCPI could be determined and/or the indication that the cybersecurity posture of the first V2X entity is too low for the V2X Entity to participate in a V2X system included in the response message to the first Authorization Authority and/or response message to the V2X Entity may comprise a value in a result code field, such as a response code.

The first V2X entity receives from the Authorization Server the response message containing a DCPI, an indication that no DCPI is determinable or an indication that the cybersecurity posture of the first V2X entity is too low for the V2X Entity to participate in a V2X system. In response to receiving an indication that no DCPI could be determined and/or an indication that the cybersecurity posture of the first V2X entity is too low for the V2X Entity to participate in a V2X system, the first V2X entity may: request new V2X Entity Updates, such as from an Updates Server; and/or provide an indication to an occupant of a vehicle that V2X Entity Updates are required, including producing an audible sound, lighting a lamp (for example on a dashboard), displaying a message or an icon on a display unit (for example on an infotainment system, on a dashboard), among other options.

The first V2X entity may retrieve/obtain new certificates from an Authorization Authority at any time and due to one or a combination of, for example, the first V2X entity determining that it has too few or no more valid certificates to use in a V2X system; the first V2X entity detecting that one or more certificates are included in/indicated on a Certificate Revocation List (CRL); new V2X Entity Updates having been installed/applied into the first V2X Entity; due to a timer expiry; among other options.

Characteristics of Cybersecurity Data

In accordance with the embodiments of FIGS. 4 and 5 above, Cybersecurity Data may include one or more of the following for a V2X Entity.

In a first case, Cybersecurity Data may include a V2X Entity identity/identifier such as a canonical ID; a certificate, including for example a certificate as defined by IEEE 1609.2, as defined by X.509, an Enrolment Certificate, pseudonym/application certificate, Authorization Ticket; Linkage seed/value; Internet Protocol (IP) address; host name (which may include a domain name), a Uniform Resource Locator (URL), a Uniform Resource Indicator (URI), a Network Access Identifier (NAI), an access token, among other options.

In a further case, Cybersecurity Data may include an indication of a manufacturer, an operating system, and/or an application for a V2X Entity or a component of a V2X Entity, which collectively may be known as a "component manifest" or "bill of materials".

In a further case, Cybersecurity Data may include an indication of a version of one or more components, such as a software, firmware, hardware, or system component, among others.

In a further case, Cybersecurity Data may include a date/time of last contact with a network server such as an Updates Server, Anomaly Detection Server, Enrolment Authority, Authorization Authority, among other options.

In a further case, Cybersecurity Data may include a date/time that a component, such as a software, firmware, hardware, or system component, was downloaded/installed. This may be referred to as a date/time stamp of the component.

In a further case, Cybersecurity Data may include an indication of one or more mitigated/addressed vulnerabilities/cybersecurity issues (for example, Common Vulnerabilities and Exposures (CVEs)) in the V2X Entity or in a component.

In a further case, Cybersecurity Data may include an indication of one or more assurance/cybersecurity levels. This may include a Trust Assurance Level (TAL) for C2X stations, a Cybersecurity Assurance Level (CAL) as defined in ISO/SAE 21434 or a Security Level (SL) as defined in ISA/IEC 62443-3-3.

In a further case, Cybersecurity Data may include an indication of one or more anomalies detected.

As indicated above, the Cybersecurity Data may be a combination of one or more of the above.

Characteristics of Dynamic Cybersecurity Posture Information (DCPI)

In order to account for the dynamic aspect of cybersecurity posture, as for example described with regards to FIG. 3, the DCPI may contain one or more date/time stamp fields. The date/time stamp fields may provide a date/time: indicating when the hardware and/or software comprising the V2X entity was last audited/certified as being cybersecure, for example to a certain standard or grade and may be indicated in the assuranceLevel field in a certificate as described below; providing the latest security patch downloaded and/or installed by a V2X Entity; providing the V2X Entity's last connection to an Updates Server; providing the V2X Entity's last connection to an Anomaly Detection Server; providing a software (component) build; among other options.

In some cases, the value in the date/time stamp field of the DCPI may be obfuscated to enhance privacy of the sending V2X entity. Such obfuscation may entail: indication of a month and year only; indication of a year and quarter only; indication of a predefined time period indication (e.g. "period 1"), which indicates any time between two specific dates (e.g. between 2019-12-01 00:00 and 2020-01-08 23:59); and/or indication of a relative (for example to the time of sending the message) time period, including in the past 1 week/month/year, in the past 3 months/weeks/years, among other examples.

When an entity in a V2X system such as a V2X Entity, V2X Entity CPDS, Enrolment Authority, Authorization Authority, or other entity (referred to hereafter as a "V2X system entity") determines a trustworthiness of a message based on a DCPI, then a more recent date in a date field may take priority and yield a higher trustworthiness over a later date or a later date may take priority over a more recent date in some cases.

The DCPI may also, or alternatively, comprise an indication of known vulnerabilities that the software and/or hardware comprising a V2X Entity has been mitigated/patched against. This may include a list of one or more indications of component identifiers (such as a Software Identification Number (SWIN)), where each component has associated with it one or more vulnerabilities that have been mitigated/patched.

When a V2X system entity determines a trustworthiness of a message based on a DCPI, then these values may be numeric and either a lower number takes priority over a higher number or a higher number takes priority over a lower number. The values may be aggregated and the aggregated value used to determine the trustworthiness. Aggregation may include the numbers being added together, being used to produce an average, among other options.

A cybersecurity posture level may also be indicated, which may be on a per V2X Entity basis or on a per component basis, or a combination of these. The cybersecurity posture level may comprise a value indicating a level and may also have a date/time associated with it. Such value may be a numeric value, an alphabetic value, an alphanumeric value, among other options.

The cybersecurity posture level may be indicated in an existing field in a V2X certificate such as a subject assurance/assuranceLevel field as defined in IEEE 1609.2, or indicated in a new field. The value of the cybersecurity posture level may contain a value based on an existing standard or scheme. For example, the value may be a Trust Assurance Level (TAL) for C2X stations; a CAL as defined in ISO/SAE 21434; and/or a SL as defined in ISA/IEC 62443-3-3.

The value of the cybersecurity posture level may be numeric, alphabetic or alphanumeric. If numeric values are used then when a V2X system entity determines a trustworthiness based on a DCPI, a lower number may take priority over a higher number or a higher number may take priority over a lower number. If more than one cybersecurity posture level is indicated then all or a subset of the values of the cybersecurity posture level may be aggregated and the aggregated value is then used to determine the trustworthiness. Aggregation may include having the cybersecurity posture levels added together, used to produce an average, used to produce a standard deviation, a highest value selected, a lowest value selected, using the Common Vulnerability Scoring System (CVSS) defined metrics and scoring, among other options.

Alternatively, the associated cybersecurity posture level indicated may contain a value based on one or more of the following. In one case a value may indicate a software version or build. In this case, an indication of software details may also be provided. For example, this may be an indication of the software manufacturer/owner/creator/maintainer.

In another case, a value may indicate a hardware version or build. In this case, an indication of hardware details may also be provided. For example, the indication may provide the software manufacturer/owner/creator/maintainer, an indication of a circuit board and/or chipset, among other options.

In another case, a value may indicate a cybersecurity posture score.

In another case, a value may indicate a vulnerability/cyber-insecurity score.

A value indicating a vulnerability score may be a Cybersecurity Vulnerability Scoring System (CVSS) score or aggregated (and possibly quantized) CVSS score of a V2X Entity.

Characteristics of No DCPI Indication

A No DCPI Indication may be a new information element or may be a value in an existing information element. For example, a No DCPI Indication may be a new information element of type NULL whose presence indicates no DCPI could be determined, a new value in an existing result/error code field whose value indicates no DCPI could be determined, a value in a new information element whose value indicates no DCPI could be determined, among other options. The purpose of the No DCPI Indication is to indicate to a receiving V2X entity that the current cybersecurity posture of the V2X entity is unknown. It may also imply that a V2X Entity needs to update/improve/enhance its cybersecurity posture, which may be achieved by the V2X entity performing/installing/applying V2X Entity Updates to components of the V2X Entity, for example by downloading V2X Entity Updates from an Updates Server, by receiving V2X Entity Updates from an Updates Server, as described in FIGS. 4 and 5 above.

Characteristics of V2X Entity Updates Data

The V2X Entity Updates Data may include one or more of the following.

In a first case, the V2X Entity Updates Data may include an indication of a manufacturer, an operating system, and/or an application for a V2X Entity or a component of a V2X Entity (collectively may be known as a "component manifest" or "bill of materials").

In another case, the V2X Entity Updates Data may include an indication of a version or a date/time stamp of one or more components, such as an SWIN.

In another case, the V2X Entity Updates Data may include a date/time of last contact with an Updates Server.

In another case, the V2X Entity Updates Data may include a date/time that a component, such as software, firmware, hardware, or system component, was downloaded/installed. In other words, this is a date/time stamp of the installation of a component.

Characteristics of V2X Entity Anomaly Detection Data

The V2X Entity Anomaly Detection Data may include one or more of the following.

In a first case, the V2X Entity Anomaly Detection Data may include an indication of a manufacturer, an operating system, and/or an application for a V2X Entity or a component of a V2X Entity (collectively these may be known as a "component manifest" or "bill of materials").

In another case the V2X Entity Anomaly Detection Data may include an indication of the number and/or severity of anomalies detected in one or more components.

In another case the V2X Entity Anomaly Detection Data may include a Date/time of last contact with an Anomaly Detection Server.

The severity of anomalies detected may be a Cybersecurity Vulnerability Scoring System (CVSS) score or aggregated (and possibly quantized) CVSS score, for example by using the CVSS defined metrics and scoring.

Characteristics of DCP Too Low Indication

A DCP Too Low Indication may be a new information element or may be a value in an existing information element. For example, a DCP Too Low Indication may be a new information element of type NULL whose presence indicates that the DCP of a V2X Entity is too low for a V2X system, a new value in an existing result/error code field whose value indicates that the DCP of a V2X Entity is too low for a V2X system, or a value in a new information element whose value indicates that the DCP of a V2X Entity is too low for a V2X system.

The purpose of the DCP Too Low Indication is to indicate to a receiving V2X Entity that the current cybersecurity posture of the V2X Entity is too low for the V2X Entity to participate in a V2X system. It may also imply that the V2X Entity needs to update/improve/enhance its cybersecurity posture, which may be achieved by the V2X entity performing/installing/applying V2X Entity Updates to components of the V2X Entity e.g. by downloading V2X Entity Updates from an Updates Server, by receiving V2X Entity Updates from an Updates Server, as for example described with regard to the embodiments of FIGS. 4 and 5 above.

Adding a V2X Entity to a CRL when an Event Occurs at an Updates Server or Anomaly Detection Server In a further embodiment, a V2X Entity may send one or both of: a request message to an Updates Server, including requesting one or more V2X Entity Updates or requesting information relating to one or more V2X Entity Updates; and/or a request message to an Anomaly Detection Server, for example to report a detected anomaly, or to provide information for the Anomaly Detection Server to detect an anomaly.

The above request contains an Update Client identity/identifier (ID) of an Update Client or an Anomaly Detection Client ID of an Anomaly Detection Client, and may also contain a V2X Client ID, such as a Canonical ID, a certificate of a V2X Client associated with the V2X entity, among other options.

The Updates Server, upon receiving the request message that contains an Update Client ID and one or more V2X Client IDs, stores an association between the Update Client ID and the one or more V2X Client IDs. The updates server may further optionally also store additional information such as V2X Entity Updates that the Update Client downloaded, including version information, software component information, among other data.

If or when an event occurs at the Updates Server, then the Updates Server may send a CRL Addition Request message to a Certificate Authority that includes a stored one or more V2X Client IDs associated with the Update Client ID associated with the Update Client in the V2X Entity. Such event may include a time since the V2X Entity last connected to check for V2X Entity Updates exceeds a threshold, a time a V2X Entity Update is instigated/installed/made available to a V2X Entity in the Updates Server, among other options.

As an alternative to sending the message to the Certificate Authority if or when the event occurs at the Updates Server, the Updates Server may send an Inform Updates Server Event message to a V2X Entity CPDS. This may occur, for example, if there is no stored associated one or more V2X Client IDs for the Update Client ID.

The Anomaly Detection Server, upon receiving the request message that contains an Anomaly Detection Client ID and one or more V2X Client IDs, stores an association between the Anomaly Detection ID and the one or more V2X Client IDs. If or when an event occurs at the Anomaly Detection Server, then the Anomaly Detection Server may send a CRL Addition Request message to a Certificate Authority that includes a stored one or more V2X Client IDs associated with the Anomaly Detection Client ID associated with the Anomaly Detection Client in the V2X Entity. Such event may include a time since the V2X Entity last connected to report anomalies or provide anomaly detection information exceeds a time threshold, a time a new anomaly in the V2X Entity is detected, among other options.

As an alternative to sending the message to the Certificate Authority if or when the event occurs at the Anomaly Detection Server, the Anomaly Detection Server may send an Inform Anomaly Detection Event message to a V2X Entity CPDS. In this case, the event may include the case where there is no stored associated one or more V2X Client IDs for the Anomaly Detection Client ID.

Upon receiving an Inform Updates Server Event message containing an Updates Client ID or an Inform Anomaly Detection Server Event message containing an Anomaly Detection Client ID, the V2X Entity CPDS may determine one or more V2X Client IDs associated with the received Updates Client ID or Anomaly Detection Client ID, and may send a CRL Addition Request message to a Certificate Authority that includes the determined one or more V2X Client IDs. The V2X Entity CPDS may determine one or more V2X Client IDs associated with the received Updates Client ID or Anomaly Detection Client ID by means of interrogating a preconfigured list, store, or database, among other options.

Upon receiving the CRL Addition Request from the Updates Server or the Anomaly Detection Server or the V2X Entity CPDS, the Certificate Authority may add one or more entries to one or more Certificate Revocation Lists (CRLs), where the entries correspond with one or more V2X certificates associated with the V2X Entity identified by a V2X Client ID. Alternatively, the Updates Server, Anomaly Detection Server, Certificate Authority or V2X Entity CPDS, may send a request message to another entity such as a CRL Store, Misbehavior Authority, among others, to request the other entity to add one or more entries to one or more CRLs.

Subsequently, all V2X Entities of a V2X System that download and apply the one or more CRLs will then blacklist the V2X Client/V2X Entity, which may include actions such as ignoring, silently discarding, or dropping V2X messages received from the V2X Client/V2X Entity.

If the V2X Entity discovers one or more of its certificates in one or more CRLs, then a remedial action may be taken by the V2X Entity, such as performing the embodiments of FIG. 4 or 5 described above.

In some instances, a V2X Entity may contain separate clients for V2X messaging (a V2X Client) and Updates Messaging (an Updates Client), and the Updates Client may not have V2X Client IDs available to it. In this case the Updates Client may send a V2X Client ID Request message to the V2X Client to obtain one or more V2X Client IDs. This may be done, for example, via an API or via AT commands.

The V2X Client receives the V2X Client ID Request message from the Updates Client and sends a V2X Client ID Response message to the Updates Client that includes one or more V2X Client IDs.

In further instances, a V2X Entity may contain separate clients for V2X messaging (a V2X Client) and Anomaly Detection Messaging (an Anomaly Detection Client), and the Anomaly Detection Client may not have V2X Client IDs available to it. In this case the Anomaly Detection Client may send a V2X Client ID Request message to the V2X Client to obtain one or more V2X Client IDs. This may be done via an API or via AT commands.

The V2X Client receives the V2X Client ID Request message from the Anomaly Detection Client and sends a V2X Client ID Response message to the Anomaly Detection Client that includes one or more V2X Client IDs.

Figure 6:
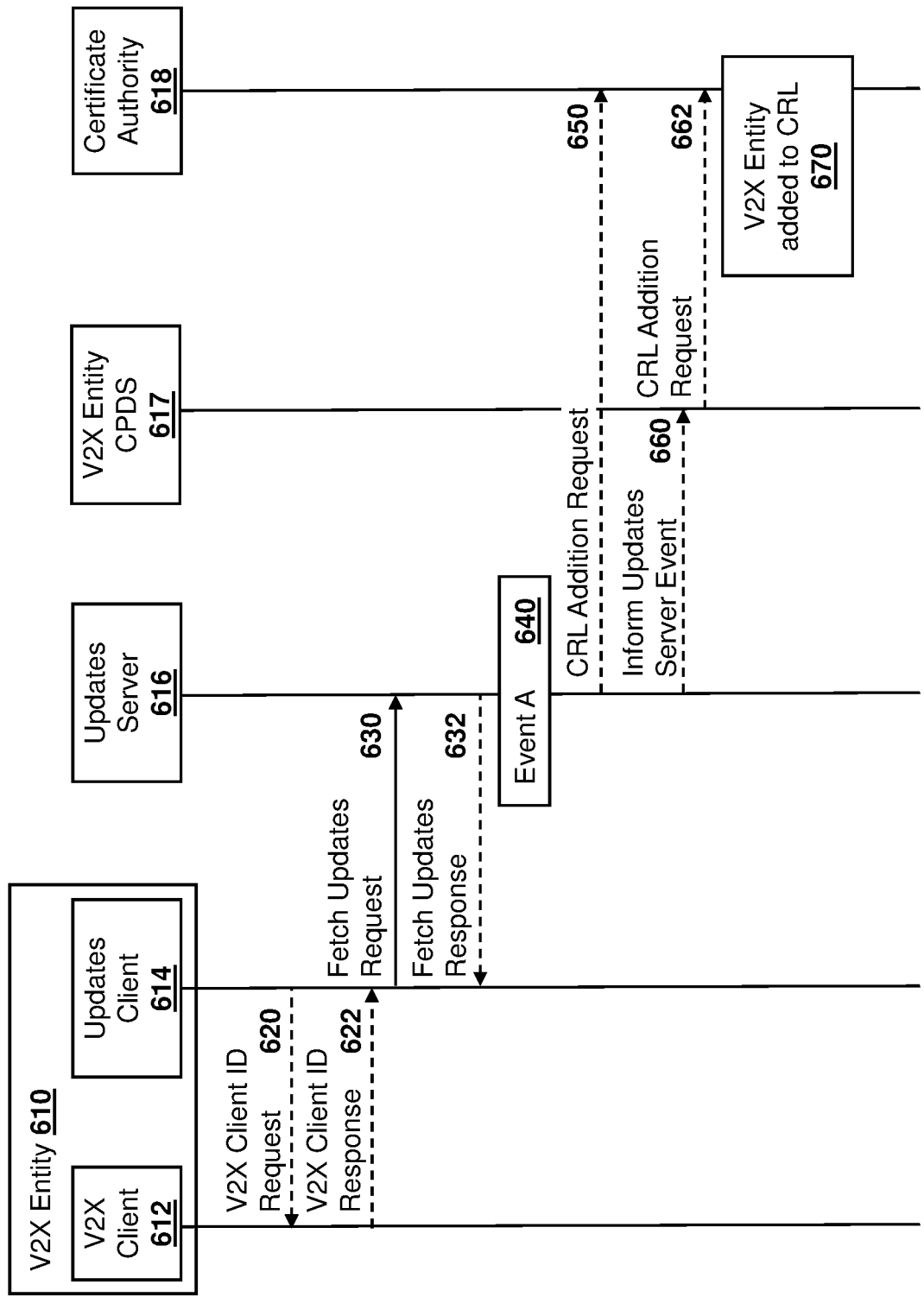
FIG. 6 is a dataflow diagram showing the addition of a V2X entity onto a certificate revocation list based on a cybersecurity posture from an updates server.

Reference is now made to FIG. 6. In the embodiment of FIG. 6, a V2X Entity 610 includes a V2X client 612 as well as an Updates Client 614. Other network entities include an Updates Server 616, a V2X Entity CPDS 617 and a Certificate Authority 618, which may comprise or communicate with one or more other entities, for example a "Distribution Center" (who may distribute one or more CRLs, a Misbehavior Authority (who may sign one or more CRLs), amongst other options.

As with the embodiments of FIGS. 4 and 5, dotted lines in the example of FIG. 6 indicate optional or conditional message flows.

In the example of FIG. 6, an Updates Client 614 may send V2X Client ID Request message 620 to V2X Client 612. This may, for example, be done if the Updates Client 614 does not have any or sufficient V2X client IDs.

Upon receiving V2X Client ID Request message 620, V2X Client 612 sends V2X Client ID Response message 622 to Updates Client 614, which includes one or more V2X Client IDs.

Updates Client 614 or another module within V2X Entity 610 sends Fetch Updates Request message 630 to Updates Server 616, which includes Updates Client ID and may also include one or more V2X Client IDs. Such V2X Client IDs may have been received within message 622.

Upon receiving Fetch Updates Request message 630, Updates Server 616 may send Fetch Updates Response message 632 to Updates Client 614 or another module on V2X Entity 610, which may include one or more V2X Entity Updates or information about one or more V2X Entity Updates. Updates Client 614 or another module on V2X Entity 610 receives Fetch Updates Response message 632. Updates Client 614 or another module on V2X Entity 610 may install or apply V2X Entity Updates. Such updates may have been received, for example, in the Fetch Updates Response message 632 in some cases. In other cases, such updates may be received by initiating a new message to an Updates Server or another server, among other options.

After a period of time, Event A 640 occurs. Event A 640 may occur before Report Anomaly Request message 630 is received and may be one or more of the following.

In a first case, Event A 640 may be a time threshold being exceeded for receiving a Fetch Updates Request message 630 from the Updates Client 614.

In a further case, Event A 640 may be a time threshold being exceeded for a new update being fetched by Updates Client 614.

In a further case, Event A 640 may be another event type.

Due to the occurrence of Event A 640, Updates Server 616 may perform one of two actions. In a first case, Updates Server 616 may send a CRL Addition Request message 650 to Certificate Authority 618, which includes one or more V2X Client IDs as for example received in message 630.

Alternatively, Updates Server 616 may send Inform Updates Server Event message 660 to V2X Entity CPDS 617, which includes an Updates Client ID associated with Updates Client 614 or V2X Entity 610, as for example received in message 630.

In some cases, Updates Server 616 may send message 660 instead of message 650 if Updates Server 616 did not receive one or more V2X Client IDs in message 630 or did not receive message 630.

Upon receiving Inform Updates Server Event message 660, the V2X Entity CPDS 617 determines one or more V2X Client IDs associated with the Update Client ID received in the Inform Event message 660, and then sends CRL Addition Request message 662 to Certificate Authority 618. Message 662 includes the one or more determined V2X Client IDs. The determining of one or more V2X Client IDs may be accomplished by interrogating a list, store, or database, or may be accomplished by configuration or pre-configuration of the data, among other options.

Prior to sending message 662, the V2X Entity CPDS 617 is assumed to have been provisioned with data or information that associates an Updates Client ID with one or more V2X Client IDs. In this case, the V2X Client ID may be an identity/identifier that does not change over the lifetime of the V2X Entity 610, such as a Canonical ID.

Further, message 662 may be skipped if Updates Server 616 sends CRL Addition Request message 650 to Certificate Authority 618.

Upon receiving CRL Addition Request message 650 or 662 from the Updates Server 616 or V2X Entity CPDS 617, Certificate Authority 618 adds to a Certificate Revocation List (CRL) one or more entries pertaining to V2X Entity identified by the one or more V2X Client IDs in messages 650 or 662, as shown at block 670. In other words, Certificate Authority 618 adds V2X Client 612 or V2X Entity 610 to a CRL.

The action of adding to the CRL one or more entries pertaining to the one or more V2X Client IDs received message 650 or 662 may involve Certificate Authority 618 sending a message to another entity such as a CRL Store or Misbehavior Authority that includes the V2X Client IDs received in message 650 or 662.

After being added to the CRL, V2X Client 612 of V2X Entity 610 may discover one or more of its certificates in one or more CRLs and may take a remedial action. For example, the remedial action may be to perform the embodiments of FIG. 4 or 5 described above.

The Updates Server 616 may be an OMA DM server or an Uptane server in some cases. The V2X Client 612 may comprise an OMA DM client and/or UPTANE client functionality in some cases. The Certificate Authority 618 may be or may comprise of a Misbehavior Authority and the CRL Addition Request message may be or may comprise of a Misbehavior Report.

One or more of the entities shown in FIG. 6 may be combined with one or more of each other. In addition, the messaging depicted in FIG. 6 may be performed in a different order to that shown.

Figure 7:
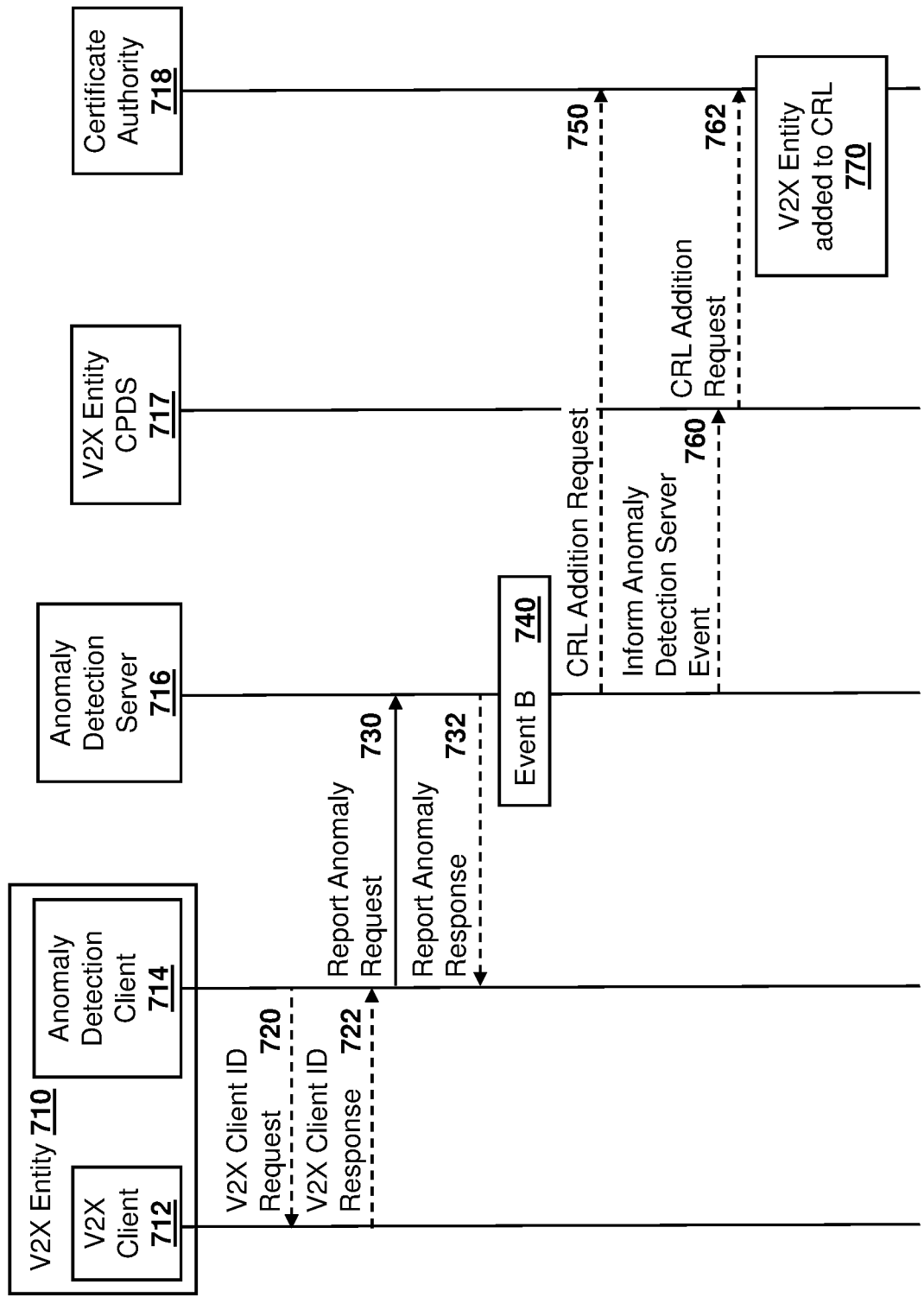
FIG. 7 is a dataflow diagram showing the addition of a V2X entity onto a certificate revocation list based on a cybersecurity posture from an anomaly detection server.

Rather than, or in addition to, an updates client, a V2X Entity may include an anomaly detection client. Reference is now made to FIG. 7.

In the embodiment of FIG. 7, V2X Entity 710 includes a V2X Client 712, as well as an Anomaly Detection Client 714.

As with the embodiments of FIGS. 4, 5 and 6, dotted lines in the example of FIG. 7 indicate optional or conditional message flows.

The network further includes an Anomaly Detection Server 716, a V2X Entity CPDS 717 and a Certificate Authority 718.

In the example of FIG. 7, an Anomaly Detection Client 714 may send V2X Client ID Request message 720 to V2X Client 712. This may, for example, be done if the Anomaly Detection Client 714 does not have any or sufficient V2X client IDs.

Upon receiving V2X Client ID Request message 720, V2X Client 712 sends V2X Client ID Response message 722 to Anomaly Detection Client 714, which includes one or more V2X Client IDs.

Anomaly Detection Client 714 sends Report Anomaly Request message 730 to Anomaly Detection Server 716, which includes Anomaly Detection Client ID and may also include one or more V2X Client IDs. Such V2X Client IDs may have been received within message 722.

Upon receiving Report Anomaly Request message 730, Anomaly Detection Server 716 may send Report Anomaly Updates Response message 732 to Anomaly Detection Client 714.

After a period of time, Event B 740 occurs. Event B 740 may occur before Report Anomaly Request message 730 is received and may be one or more of the following.

In a first case, Event B 740 may be a time threshold exceeding for receiving a Report Anomaly Request message 730 from the Anomaly Detection Client 714.

In a further case, Event B 740 may be an anomaly being detected in the V2X Entity 710 and/or the Anomaly Detection Client 714.

In a further case, Event B 740 may be another event type.

Due to the occurrence of Event B 740, Anomaly Detection Server 716 may perform one of two actions. In a first case, Anomaly Detection Server 716 may send a CRL Addition Request message 750 to Certificate Authority 718, which includes one or more V2X Client IDs as for example received in message 730.

Alternatively, Anomaly Detection Server 716 may send Inform Anomaly Detection Server Event message 760 to V2X Entity CPDS 717, which includes an Anomaly Detection Client ID associated with Anomaly Detection Client 714 or V2X Entity 710, as for example received in message 730.

In some cases, Anomaly Detection Server 716 may send message 760 instead of message 750 if Anomaly Detection Server 716 did not receive one or more V2X Client IDs in message 730 or did not receive message 730.

Upon receiving Inform Anomaly Detection Server Event message 760, the V2X Entity CPDS 717 determines one or more V2X Client IDs associated with the Anomaly Detection Client ID received in the Inform Anomaly Detection Server Event message 760, and then sends CRL Addition Request message 762 to Certificate Authority 718. Message 762 includes the one or more determined V2X Client IDs. The determining of one or more V2X Client IDs may be accomplished by interrogating a list, store, or database, or may be accomplished by configuration or pre-configuration of the data, among other options.

Prior to sending message 762, the V2X Entity CPDS 717 is assumed to have been provisioned with data or information that associates an Anomaly Detection Client ID with one or more V2X Client IDs. In this case, the V2X Client ID may be an identity/identifier that does not change over the lifetime of the V2X Entity 710, such as a Canonical ID.

Further, message 762 may be skipped if Anomaly Detection Server 716 sends CRL Addition Request message 750 to Certificate Authority 718.

Upon receiving CRL Addition Request message 750 or 762 from the Anomaly Detection Server 716 or V2X Entity CPDS 717, Certificate Authority 718 adds to a Certificate Revocation List (CRL) one or more entries pertaining to V2X Entity identified by the one or more V2X Client IDs in messages 750 or 762, as shown at block 770. In other words, Certificate Authority 718 adds V2X Client 712 or V2X Entity 710 to a CRL.

The action of adding to the CRL one or more entries pertaining to the one or more V2X Client IDs received message 750 or 762 may involve Certificate Authority 718 sending a message to another entity such as a CRL Store or Misbehavior Authority that includes the V2X Client IDs received in message 750 or 762.

After being added to the CRL, V2X Client 712 or V2X Entity 710 may discover one or more of its certificates in one or more CRLs and may take a remedial action. For example, the remedial action may be to perform the embodiments of FIG. 4 or 5 described above.

The Anomaly Detection Server 716 may be an IETF NEA Server as defined in IETF RFC 5209 in some cases. The Anomaly Detection Client 714 may comprise an IETF NEA client as defined in IETF RFC 5209 in some cases. The Certificate Authority may be or may comprise a Misbehavior Authority and the CRL Addition Request message may be or may comprise a Misbehavior Report.

One or more of the entities shown in FIG. 7 may be combined with one or more of each other. In addition, the messaging depicted in FIG. 7 may be performed in a different order to that shown.

Characteristics of a V2X Client ID

A V2X Entity ID identifies a V2X entity and/or a V2X client, and may consist of one or more of the following: Canonical ID; a certificate for example as defined by IEEE 1609.2, as defined by X.509, Enrolment Certificate, Application certificate or Authorization Ticket; Linkage seed/value(s); IP address; host name, which may include a domain name/Fully Qualified Domain Name (FQDN); a URL; a URI; an NAI; a Device ID; an International Mobile Equipment Identity (IMEI); an SWIN; among other options.

Characteristics of an Updates Client ID

An Updates Client ID identifies an update client and/or a V2X entity, and may consist of one or more of the following: an IP address; a host name, which may include a domain name/FQDN; a URL; a URI; an NAI; a Device ID; an IMEI; an SWIN; among other options.

Characteristics of an Anomaly Detection Client ID

An Anomaly Detection Client ID identifies an anomaly detection client and/or a V2X entity, and may consist of one or more of the following: an IP address; a host name, which may include a domain name/FQDN; a URL; a URI; an NAI; a Device ID; an IMEI; an SWIN; among other options Protocol Changes Example changes to the "ToBeSignedCertificate" ASN.1 definition in IEEE 1609.2 are shown in the Appendices below, which include multiple options for the newly introduced Cybersecurity Posture Level.

In particular, protocol changes to support the embodiments of FIGS. 4 and 5 are shown in Appendix A below. In Appendix A, Tables 3 to 17 have changes to existing protocols shown in bold.

Protocol changes to support the embodiments of FIGS. 6 and 7 are shown in Appendix B below. In Appendix B, Table 18 has changes to existing protocols shown in bold.

Hardware

A V2X Entity, V2X Client, Enrolment Authority, V2X Entity CPDS, Authorization Authority, Updates Server, Anomaly Detection Sever, Certificate Authority, or a network server or node may be any type of computing device. For example, one simplified computing device that may perform the embodiments described above is provided with regards to FIG. 8.

Figure 8:
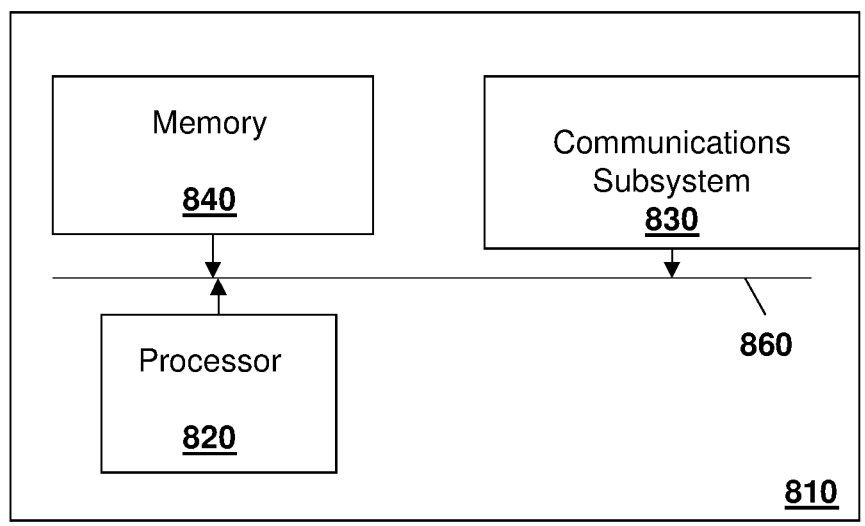
FIG. 8 is a block diagram of an example computing device or server capable of being used with the embodiments of the present disclosure.

In FIG. 8, computing device 810 includes a processor 820 and a communications subsystem 830, where the processor 820 and communications subsystem 830 cooperate to perform the methods of the embodiments described herein.

The processor 820 is configured to execute programmable logic, which may be stored, along with data, on the computing device 810, and is shown in the example of FIG. 8 as memory 840. The memory 840 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 820 may also be implemented entirely in hardware and not require any stored program to execute logic functions.

Alternatively, or in addition to the memory 840, the computing device 810 may access data or programmable logic from an external storage medium, for example through the communications subsystem 830.

The communications subsystem 830 allows the computing device 810 to communicate with other devices or network elements.

Communications between the various elements of the computing device 810 may be through an internal bus 860 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

APPENDIX A

TABLE 3

| Example changes to IEEE 1609.2 ASN.1 - certificate definition |
|---|
| ToBeSignedCertificate ::= SEQUENCE {<br>    Id                                                CertificateId,<br>    cracaId                                      HashedId3,<br>    crlSeries                                  CrlSeries,<br>    validityPeriod                       ValidityPeriod,<br>    region                                     GeographicRegion OPTIONAL,<br>    assuranceLevel                     SubjectAssurance OPTIONAL,<br>    appPermissions                     SequenceOfPsidSsp OPTIONAL,<br>    certIssuePermissions       SequenceOfPsidGroupPermissions OPTIONAL,<br>    certRequestPermissions     SequenceOfPsidGroupPermissions OPTIONAL,<br>    canRequestRollover           NULL OPTIONAL,<br>    encryptionKey                    PublicEncryptionKey OPTIONAL,<br>    verifyKeyIndicator           VerificationKeyIndicator,<br>    ...,<br>    dynamicCybersecurityPostureInfoDynamicCybersecurityPostureInfo OPTIONAL<br>}<br>(WITH COMPONENTS { ..., appPermissions PRESENT} \|<br>  WITH COMPONENTS { ..., certIssuePermissions PRESENT} \|<br>  WITH COMPONENTS { ..., certRequestPermissions PRESENT}) |

TABLE 4

Example changes to ETSI TS 102 941 - AuthorizationValidationResponse message

```
AuthorizationValidationResponse ::= SEQUENCE {
  requestHash         OCTET STRING (SIZE(16)),
  responseCode        AuthorizationValidationResponseCode,
  confirmedSubjectAttributes   CertificateSubjectAttributes (WITH
COMPONENTS{..., certIssuePermissions ABSENT}) OPTIONAL,
  ...
  dynamicCybersecurityPostureInfo DynamicCybersecurityPostureInfo
OPTIONAL
}
  (WITH COMPONENTS { responseCode (ok),
  confirmedSubjectAttributes PRESENT
}
  | WITH COMPONENTS { responseCode (ALL EXCEPT ok),
confirmedSubjectAttributes ABSENT }
)
```

TABLE 5

Example ASN.1 definition of "DynamicCybersecurityPostureInfo"

```
DynamicCybersecurityPostureInfo ::= SEQUENCE {
    assuranceLevelDateTime           Time64 OPTIONAL,
    lastAnomalyCheck                 Time64 OPTIONAL,
    lastUpdateDateTimeStamp          Time64 OPTIONAL,
    v2XsoftwareBuildDateTimeStamp    Time64 OPTIONAL,
    cybersecurityPostureLevel        CybersecurityPostureLevel
OPTIONAL,
    componentManifest                ComponentManifest
    ...
}
```

TABLE 6

Example ASN.1 definition of "CybersecurityPostureLevel" (1)

```
CybersecurityPostureLevel ::= SEQUENCE {
    levelNumber           Uint3,
    dateTimeOfScore       Time64,
    ...
}
```

TABLE 7

Example ASN.1 definition of "CybersecurityPostureLevel" (2)

```
CybersecurityPostureLevel ::= SEQUENCE {
    aggregatedCVSSscore      Uint16,
    dateTimeofScore          Time64,
    ...
}
```

TABLE 8

Example ASN.1 definition of "componentManifest" Protocol changes for No DCPI Indication and DCP Too Low Indication

```
ComponentManifest::= SEQUENCE {
    softwareOwnerID       Uint32,
    softwareBuild         Uint64,
    softwareBuildDate     Time64
    hardwareOwnerID       Uint32,
    hardwareTypeID        Uint32,
    hardwareVersion       Time64,
    hardwareVersionData   Time64
    ...
}
```

TABLE 9

Example changes 1 to ETSI TS 102 941 - AuthorizationValidationResponse message

```
AuthorizationValidationResponse ::= SEQUENCE {
  requestHash         OCTET STRING (SIZE(16)),
  responseCode        AuthorizationValidationResponseCode,
  confirmedSubjectAttributes   CertificateSubjectAttributes (WITH
COMPONENTS{..., certIssuePermissions ABSENT}) OPTIONAL,
  ...
}
  (WITH COMPONENTS { responseCode (ok),
  confirmedSubjectAttributes PRESENT
}
  | WITH COMPONENTS { responseCode (ALL EXCEPT ok),
confirmedSubjectAttributes ABSENT }
)
AuthorizationValidationResponseCode ::= ENUMERATED {
  ok(0),
  cantparse, -- valid for any structure
  badcontenttype, -- not encrypted, not signed, not
  permissionsverificationrequest
  imnottherecipient, -- the "recipients" of the outermost
encrypted data doesn't include me
  unknownencryptionalgorithm, -- either kexalg or
  contentencryptionalgorithm
  decryptionfailed, -- works for ECIES-HMAC and AES-CCM
  invalidaa, -- the AA certificate presented is invalid/revoked/whatever
  invalidaasignature, -- the AA certificate presented can't
  validate the request signature
  wrongea, -- the encrypted signature doesn't designate me as the EA
  unknownits, -- can't retrieve the EC/ITS in my DB
  invalidsignature, -- signature verification of the request by the EC fails
  invalidencryptionkey, -- signature is good, but the
  responseEncryptionKey is bad
  deniedpermissions, -- requested permissions not granted
  deniedtoomanycerts, -- parallel limit
  deniedrequest, -- any other reason?
  ...,
  Nodynamiccybersecurityposture, - Dynamic cybersecurity
posture information unobtainable
  dynamicCybersecurityPostureTooLow - Dynamic cybersecurity posture
information unacceptable
}
```

TABLE 10

Example changes 2 to ETSI TS 102 941 - AuthorizationValidationResponse message

```
AuthorizationValidationResponse ::= SEQUENCE {
  requestHash         OCTET STRING (SIZE(16)),
  responseCode        AuthorizationValidationResponseCode,
  confirmedSubjectAttributes   CertificateSubjectAttributes (WITH
COMPONENTS{..., certIssuePermissions ABSENT}) OPTIONAL,
  ...,
  noDynamicCybersecurityPostureInformation NULL OPTIONAL,
  dynamicCybersecurityPostureTooLow NULL OPTIONAL
}
  (WITH COMPONENTS { responseCode (ok),
  confirmedSubjectAttributes PRESENT
}
  | WITH COMPONENTS { responseCode (ALL EXCEPT ok),
confirmedSubjectAttributes ABSENT }
)
```

TABLE 11

Example changes 1 to ETSI TS 102 941 - AuthorizationResponse message

```
EtsiTs102941DataContent ::= CHOICE {
    enrolmentRequest       InnerEcRequestSignedForPop,
    enrolmentResponse      InnerEcResponse,
    authorizationRequest   InnerAtRequest,
    authorizationResponse  InnerAtResponse,
```

TABLE 11-continued

Example changes 1 to ETSI TS 102 941
- AuthorizationResponse message

```
    certificateRevocationList    ToBeSignedCrl,
    certificateTrustListTlm      ToBeSignedTlmCtl,
    certificateTrustListRca      ToBeSignedRcaCtl,
    ...
}
InnerAtResponse ::= SEQUENCE {
    requestHash       OCTET STRING (SIZE(16)),
    responseCode      AuthorizationResponseCode,
    certificate       EtsiTs103097Certificate OPTIONAL,
    ...
}
    (WITH COMPONENTS { responseCode (ok), certificate PRESENT}
    | WITH COMPONENTS { responseCode (ALL EXCEPT ok),
    certificate ABSENT }
    )
AuthorizationResponseCode ::= ENUMERATED {
    ok(0),
    -- ITS->AA
    its-aa-cantparse, -- valid for any structure
    its-aa-badcontenttype, -- not encrypted, not signed,
      not authorizationrequest
    its-aa-imnottherecipient, -- the "recipients" of
the outermost encrypted data doesn't include me
    its-aa-unknownencryptionalgorithm, -- either kexalg
      or contentencryptionalgorithm
    its-aa-decryptionfailed, -- works for ECIES-HMAC and AES-CCM
    its-aa-keysdontmatch, -- HMAC keyTag verification fails
    its-aa-incompleterequest, -- some elements are missing
    its-aa-invalidencryptionkey, -- the responseEncryptionKey is bad
    its-aa-outofsyncrequest, -- signingTime is outside acceptable limits
    its-aa-unknownea, -- the EA identified by eaId is unknown to me
    its-aa-invalidea, -- the EA certificate is revoked
    its-aa-deniedpermissions, -- I, the AA, deny the requested permissions
    -- AA->EA
    aa-ea-cantreachea, -- the EA is unreachable (network error?)
    -- EA->AA
    ea-aa-cantparse, -- valid for any structure
    ea-aa-badcontenttype, -- not encrypted, not signed,
      not authorizationrequest
    ea-aa-imnottherecipient, -- the "recipients" of
the outermost encrypted data doesn't include me
    ea-aa-unknownencryptionalgorithm, -- either kexalg or
      contentencryptionalgorithm
    ea-aa-decryptionfailed, -- works for ECIES-HMAC and AES-CCM
    -- TODO: to be continued...
    invalidaa, -- the AA certificate presented is invalid/revoked/whatever
    invalidaasignature, -- the AA certificate presented can't
      validate the request signature
    wrongea, -- the encrypted signature doesn't designate me as the EA
    unknownits, -- can't retrieve the EC/ITS in my DB
    invalidsignature, -- signature verification of the request by the EC fails
    invalidencryptionkey, -- signature is good, but the key is bad
    deniedpermissions, -- permissions not granted
    deniedtoomanycerts, -- parallel limit
    ...,
    noDynamicCybersecurityPosture, - Dynamic cybersecurity posture
information unobtainable
    dynamicCybersecurityPostureTooLow - Dynamic cybersecurity posture
information unacceptable
}
```

TABLE 12

Example changes 2 to ETSI TS 102 941 [5]
- AuthorizationResponse message

```
EtsiTs102941DataContent ::= CHOICE {
    enrolmentRequest         InnerEcRequestSignedForPop,
    enrolmentResponse        InnerEcResponse,
    authorizationRequest     InnerAtRequest,
    authorizationResponse    InnerAtResponse,
    certificateRevocationList    ToBeSignedCrl,
```

TABLE 12-continued

Example changes 2 to ETSI TS 102 941 [5]
- AuthorizationResponse message

```
    certificateTrustListTlm      ToBeSignedTlmCtl,
    certificateTrustListRca      ToBeSignedRcaCtl,
    ...
}
InnerAtResponse ::= SEQUENCE {
    requestHash       OCTET STRING (SIZE(16)),
    responseCode      AuthorizationResponseCode,
    certificate       EtsiTs103097Certificate OPTIONAL,
    ...,
    noDynamicCybersecurityPostureInformation NULL OPTIONAL,
    dynamicCybersecurityPostureTooLow      NULL OPTIONAL
}
    (WITH COMPONENTS { responseCode (ok), certificate PRESENT }
    | WITH COMPONENTS { responseCode (ALL EXCEPT ok),
    certificate ABSENT }
    )
```

Protocol Changes for Cybersecurity Data

The changes to protocol for Cybersecurity Data are similar to that of the DCPI, since the two may contain similar or the same information.

TABLE 13

Example changes to ETSI TS 102 941 [5]
ASN.1 Authority Request

```
EtsiTs102941DataContent ::= CHOICE {
    enrolmentRequest              InnerEcRequestSignedForPop,
    enrolmentResponse             InnerEcResponse,
    authorizationRequest          InnerAtRequest,
    authorizationResponse         InnerAtResponse,
    certificateRevocationList     ToBeSignedCrl,
    certificateTrustListTlm       ToBeSignedTlmCtl,
    certificateTrustListRca       ToBeSignedRcaCtl,
    authorizationValidationRequest    AuthorizationValidationRequest,
    authorizationValidationResponse   AuthorizationValidationResponse,
    caCertificateRequest          CaCertificateRequest,
    ...
}
InnerAtRequest ::= SEQUENCE {
    publicKeys        PublicKeys,
    hmacKey           OCTET STRING (SIZE(32)),
    sharedAtRequest   SharedAtRequest,
    ecSignature       EcSignature,
    ...
}
SharedAtRequest ::= SEQUENCE {
    eaId              HashedId8,
    keyTag            OCTET STRING (SIZE(16)),
    certificateFormat    CertificateFormat,
    requestedSubjectAttributes   CertificateSubjectAttributes (WITH
COMPONENTS{..., certIssuePermissions ABSENT}),
    ...,
    cybersecurityData        CybersecurityData OPTIONAL
}
```

TABLE 14

Example changes to ETSI TS 102 941 [5]
ASN.1 Validation Request

```
AuthorizationValidationRequest ::= SEQUENCE {
    sharedAtRequest    SharedAtRequest,
    ecSignature        EcSignature,
    ...,
    cybersecurityData    CybersecurityData OPTIONAL
}
```

TABLE 15

Example ASN.1 definition of "CybersecurityData"

```
CybersecurityData ::= SEQUENCE {
    lastAnomalyCheck        Time64 OPTIONAL,
    lastUpdate              Time64 OPTIONAL,
    lastEnrolment           Time64 OPTIONAL,
    lastAuthorisation       Time64 OPTIONAL,
    anomaliesDetected       Uint16 OPTIONAL,
    v2XsoftwareBuildDateTimeStamp Time64 OPTIONAL,
    cybersecurityPostureLevel   CybersecurityPostureLevel OPTIONAL,
    componentManifest       ComponentManifest OPTIONAL,
    aggregatedCVSSscore     Uint16 OPTIONAL,
    cybersecurityPostureLevel   CybersecurityPostureLevel OPTIONAL,
    ...
}
```

Protocol changes for V2X Entity Updates Data and V2X Entity Anomaly Detection Data

TABLE 16

Example ASN.1 definition of V2X Entity Updates Data and V2X Entity Anomaly Detection Data

```
V2XentityUpdatesData ::= SEQUENCE {
    componentManifest       ComponentManifestForUpdates OPTIONAL,
    v2XsoftwareBuildDateTimeStamp Time64 OPTIONAL,
    v2XsoftwareInstallDateTimeStamp Time64 OPTIONAL,
    v2XsoftwareVersion      Uint16 OPTIONAL,
```

TABLE 16-continued

Example ASN.1 definition of V2X Entity Updates Data and V2X Entity Anomaly Detection Data

```
    lastSeenAtUpdatesServer     Time64 OPTIONAL,
    ...
}
V2XentityAnomalyDetectionData ::= SEQUENCE {
    componentManifest
    ComponentManifestForAnomalyDetection OPTIONAL,
    v2XsoftwareNumberOfAnomaliesDetected Uint16 OPTIONAL,
    v2XsoftwareSeverityOfAnomaliesDetected Uint16 OPTIONAL,
    lastSeenAtAnomalyDetectionServer   Time64 OPTIONAL,
    ...
}
ComponentManifestForUpdates ::= SEQUENCE {
    componentID             OCTET STRING (SIZE(32)),
    componentBuildDateTimeStamp   Time64 OPTIONAL,
    componentInstallDateTimeStamp Time64 OPTIONAL,
    componentVersion        Uint16 OPTIONAL,
    ...
}
ComponentManifestForAnomalyDetection ::= SEQUENCE {
    componentID             OCTET STRING (SIZE(32)),
    componentNumberOfAnomaliesDetected Uint16 OPTIONAL,
    componentSeverityOfAnomaliesDetected Uint16 OPTIONAL,
    ...
}
```

Protocol changes for messages CPD Request/Response, V2X Entity Updates Status Request/Response, and V2X Entity Anomaly Detection Status Request/Response

TABLE 17

Example ASN.1 definition of messages CPD Request/Response, V2X Entity Updates Status Request/Response, and V2X Entity Anomaly Detection Status Request/Response

```
/************
-- Messages
************/
EnrolmentRequestMessage ::= EtsiTs103097Data-SignedAndEncrypted-Unicast
{EtsiTs102941Data (WITH COMPONENTS{..., content (WITH
COMPONENTS{enrolmentRequest PRESENT})})}
EnrolmentResponseMessage ::= EtsiTs103097Data-SignedAndEncrypted-Unicast
{EtsiTs102941Data (WITH COMPONENTS{..., content (WITH
COMPONENTS{enrolmentResponse PRESENT})})}
AuthorizationRequestMessage ::= EtsiTs103097Data-Encrypted-Unicast
{EtsiTs102941Data (WITH COMPONENTS{..., content (WITH
COMPONENTS{authorizationRequest PRESENT})})}
AuthorizationRequestMessageWithPop ::= EtsiTs103097Data-SignedAndEncrypted-
Unicast {EtsiTs102941Data (WITH COMPONENTS{..., content (WITH
COMPONENTS{authorizationRequest PRESENT})})}
AuthorizationResponseMessage ::= EtsiTs103097Data-SignedAndEncrypted-Unicast
{EtsiTs102941Data (WITH COMPONENTS{..., content (WITH
COMPONENTS{authorizationResponse PRESENT})})}
CertificateRevocationListMessage ::= EtsiTs103097Data-Signed{EtsiTs102941Data
(WITH COMPONENTS{..., content (WITH COMPONENTS{certificateRevocationList
PRESENT})})}
TlmCertificateTrustListMessage ::= EtsiTs103097Data-Signed{EtsiTs102941Data
(WITH COMPONENTS{..., content (WITH COMPONENTS{certificateTrustListTlm
PRESENT})})}
RcaCertificateTrustListMessage ::= EtsiTs103097Data-Signed{EtsiTs102941Data
(WITH COMPONENTS{..., content (WITH COMPONENTS{certificateTrustListRca
PRESENT})})}
AuthorizationValidationRequestMessage ::= EtsiTs103097Data-SignedAndEncrypted-
Unicast {EtsiTs102941Data (WITH COMPONENTS{..., content (WITH
COMPONENTS{authorizationValidationRequest PRESENT})})}
AuthorizationValidationResponseMessage ::= EtsiTs103097Data-
SignedAndEncrypted-Unicast {EtsiTs102941Data (WITH COMPONENTS{..., content
(WITH COMPONENTS{authorizationValidationResponse PRESENT})})}
CaCertificateRequestMessage ::= EtsiTs103097Data-Signed
{EtsiTs102941Data(WITH COMPONENTS{..., content (WITH
COMPONENTS{caCertificateRequest PRESENT})})}
CaCertificateRekeyingMessage ::= EtsiTs103097Data-Signed {EtsiTs103097Data-
Signed {EtsiTs102941Data(WITH COMPONENTS{..., content (WITH
COMPONENTS{caCertificateRequest PRESENT})})}}
CPDrequestMessaae ::= EtsiTs103097Data-SignedAndEncrypted-Unicast
```

TABLE 17-continued

Example ASN.1 definition of messages CPD Request/Response,
V2X Entity Updates Status Request/Response, and V2X
Entity Anomaly Detection Status Request/Response {EtsiTs102941Data (WITH COMPONENTS{..., content (WITH
COMPONENTS{cPDrequest PRESENT})})}
CPDresponseMessage ::= EtsiTs103097Data-SignedAndEncrypted-Unicast
{EtsiTs102941Data (WITH COMPONENTS{..., content (WITH
COMPONENTS{cPDresponse PRESENT})})}
V2XentityUpdatesStatusRequestMessaae ::= EtsiTs103097Data-
SignedAndEncrypted-Unicast {EtsiTs102941Data (WITH COMPONENTS{...,
content (WITH COMPONENTS{v2XentityUpdatesStatusRequest PRESENT})})}
V2XentityUpdatesStatusResponseMessaqe ::= EtsiTs103097Data-
SignedAndEncrypted-Unicast {EtsiTs102941Data (WITH COMPONENTS{...,
content (WITH COMPONENTS{v2XentityUpdatesStatusResponse PRESENT})})}
V2XentityAnomalyDetectionStatusRequestMessaae ::= EtsiTs103097Data-
SignedAndEncrypted-Unicast {EtsiTs102941Data (WITH COMPONENTS{...,
content (WITH COMPONENTS{v2XentityAnomalyDetectionStatusRequest
PRESENT})})}
V2XentityUpdatesAnomalyDetectionResponseMessaae ::= EtsiTs103097Data-
SignedAndEncrypted-Unicast {EtsiTs102941Data (WITH COMPONENTS{...,
content (WITH COMPONENTS{v2XentityAnomalyDetectionStatusResponse
PRESENT})})}
/************
-- EtsiTs102941Data
************/
EtsiTs102941Data::= SEQUENCE {
　version Version (v1),
　content EtsiTs102941DataContent
　}
EtsiTs102941DataContent ::= CHOICE {
　enrolmentRequest　　　　　InnerEcRequestSignedForPop,
　enrolmentResponse　　　　 InnerEcResponse,
　authorizationRequest　　　 InnerAtRequest,
　authorizationResponse　　　InnerAtResponse,
　certificateRevocationList　 ToBeSignedCrl,
　certificateTrustListTlm　　 ToBeSignedTlmCtl,
　certificateTrustListRca　　 ToBeSignedRcaCtl,
　authorizationValidationRequest　AuthorizationValidationRequest,
　authorizationValidationResponse　AuthorizationValidationResponse,
　caCertificateRequest　　　 CaCertificateRequest,
　...,
　cPDrequest　　　　　　　InnerCPDrequest,
　cPDresponse　　　　　　 InnerCPDresponse,
　v2XentityUpdatesStatusRequest　　InnerV2XentityUpdatesStatusRequest,
　v2XentityUpdatesStatusResponse
InnerV2XentityUpdatesStatusResponse,
　v2XentityAnomalyDetectionStatusRequest
InnerV2XentityAnomalyDetectionStatusRequest
　v2XentityAnomalyDetectionStatusResponse
InnerV2XentityAnomalyDetectionStatusResponse
　}
END
InnerCPDrequest ::= SEQUENCE {
　itsId　　　　　OCTET STRING,
　cybersecurityData　　　CybersecurityData OPTIONAL,
　... }
InnerCPDresponse ::= SEQUENCE {
　requestHash　　　OCTET STRING (SIZE(16)),
　responseCode　　　CPDResponseCode,
　dynamicCybersecurityPostureInfo　DynamicCybersecurityPostureInfo,
　... }
　(WITH COMPONENTS { responseCode (ok), dynamicCybersecurityPostureInfo
PRESENT }
　　| WITH COMPONENTS { responseCode (ALL EXCEPT ok),
dynamicCybersecurityPostureInfo ABSENT }
　)
CPDResponseCode ::= ENUMERATED {
　ok(0),
　cantparse, -- valid for any structure
　badcontenttype, -- not encrypted, not signed, not enrolmentrequest
　imnottherecipient, -- the "recipients" doesn't include me
　decryptionfailed, -- works for ECIES-HMAC and AES-CCM
　unknownits, -- can't retrieve the ITS from the itsId
　baditsstatus, -- revoked, not yet active
　incompleterequest, -- some elements are missing
　deniedpermissions, -- requested permissions are not granted
　noDynamicCybersecurityPosture - Dynamic cybersecurity posture information
unobtainable or unacceptable TABLE 17-continued Example ASN.1 definition of messages CPD Request/Response,
V2X Entity Updates Status Request/Response, and V2X
Entity Anomaly Detection Status Request/Response

```
    dynamicCybersecurityPostureTooLow - Dynamic cybersecurity posture
information unacceptable
    deniedrequest, -- any other reason?
    ... }
InnerV2XentityUpdatesStatusRequest ::= SEQUENCE {
    updatesClientID        OCTET STRING,
    cybersecurityData      CybersecurityData OPTIONAL,
    ... }
InnerV2XentityUpdatesStatusResponse ::= SEQUENCE {
    requestHash        OCTET STRING (SIZE(16)),
    responseCode       V2XentityUpdatesStatusResponseCode,
    v2XentityUpdatesData   V2XentityUpdatesData,
    ... }
    (WITH COMPONENTS { responseCode (ok), v2XentityUpdatesData PRESENT }
      | WITH COMPONENTS { responseCode (ALL EXCEPT ok),
v2XentityUpdatesData ABSENT }
    )
V2XentityUpdatesStatusResponseCode ::= ENUMERATED {
    ok(0),
    cantparse, -- valid for any structure
    badcontenttype, -- not encrypted, not signed, not enrolmentrequest
    imnottherecipient, -- the "recipients" doesn't include me
    decryptionfailed, -- works for ECIES-HMAC and AES-CCM
    unknownits, -- can't retrieve the ITS from the itsId
    baditsstatus, -- revoked, not yet active
    incompleterequest, -- some elements are missinq
    deniedpermissions, -- requested permissions are not qranted
    deniedrequest, -- any other reason?
    ... }
InnerV2XentityAnomalyDetectionStatusRequest ::= SEQUENCE {
    anomalyDetectionClientID   OCTET STRING,
    cybersecurityData      CybersecurityData OPTIONAL,
    ... }
InnerV2XentityAnomalyDetectionStatusResponse ::= SEQUENCE {
    requestHash      OCTET STRING (SIZE(16)),
    responseCode
V2XentityAnomalyDetectionStatusResponseCode,
    v2XentityAnomalyDetectionData V2XentityAnomalyDetectionData,
    ... }
    (WITH COMPONENTS { responseCode (ok), v2XentityAnomalyDetectionData
PRESENT }
      | WITH COMPONENTS { responseCode (ALL EXCEPT ok),
v2XentityAnomalyDetectionData ABSENT }
    )
V2XentityAnomalyDetectionStatusResponseCode ::= ENUMERATED {
    ok(0),
    cantparse, -- valid for any structure
    badcontenttype, -- not encrypted, not signed, not enrolmentrequest
    imnottherecipient, -- the "recipients" doesn't include me
    decryptionfailed, -- works for ECIES-HMAC and AES-CCM
    unknownits, -- can't retrieve the ITS from the itsId
    baditsstatus, -- revoked, not yet active
    incompleterequest, -- some elements are missing
    deniedpermissions, -- requested permissions are not granted
    deniedrequest, -- any other reason?
    ... }
```

APPENDIX B

Protocol changes for messages Fetch Updates Request/Response, Report Anomaly Request/Response, Inform Updates Server Event, Inform Anomaly Detection Server Event, and CRL Addition Request

TABLE 18

Example ASN.1 definition of messages Fetch Updates Request, Inform Updates Server Event, Inform Anomaly Detection Server Event, and CRL Addition Request

```
/************
-- Messages
************/
EnrolmentRequestMessage ::= EtsiTs103097Data-SignedAndEncrypted-Unicast
{EtsiTs102941Data (WITH COMPONENTS{..., content (WITH
COMPONENTS{enrolmentRequest PRESENT})})}
EnrolmentResponseMessage ::= EtsiTs103097Data-SignedAndEncrypted-Unicast
{EtsiTs102941Data (WITH COMPONENTS{..., content (WITH
COMPONENTS{enrolmentResponse PRESENT})})}
AuthorizationRequestMessage ::= EtsiTs103097Data-Encrypted-Unicast
{EtsiTs102941Data (WITH COMPONENTS{..., content (WITH
COMPONENTS{authorizationRequest PRESENT})})}
AuthorizationRequestMessageWithPop ::= EtsiTs103097Data-SignedAndEncrypted-
Unicast {EtsiTs102941Data (WITH COMPONENTS{..., content (WITH
COMPONENTS{authorizationRequest PRESENT})})}
AuthorizationResponseMessage ::= EtsiTs103097Data-SignedAndEncrypted-Unicast
{EtsiTs102941Data (WITH COMPONENTS{..., content (WITH
COMPONENTS{authorizationResponse PRESENT})})}
CertificateRevocationListMessage ::= EtsiTs103097Data-Signed{EtsiTs102941Data
(WITH COMPONENTS{..., content (WITH COMPONENTS{certificateRevocationList
PRESENT})})}
TlmCertificateTrustListMessage ::= EtsiTs103097Data-Signed{EtsiTs102941Data
(WITH COMPONENTS{..., content (WITH COMPONENTS{certificateTrustListTlm
PRESENT})})}
RcaCertificateTrustListMessage EtsiTs103097Data-Signed{EtsiTs102941Data
(WITH COMPONENTS{..., content (WITH COMPONENTS{certificateTrustListRca
PRESENT})})}
AuthorizationValidationRequestMessage ::= EtsiTs103097Data-SignedAndEncrypted-
Unicast {EtsiTs102941Data (WITH COMPONENTS{..., content (WITH
COMPONENTS{authorizationValidationRequest PRESENT})})}
AuthorizationValidationResponseMessage ::= EtsiTs103097Data-
SignedAndEncrypted-Unicast {EtsiTs102941Data (WITH COMPONENTS{..., content
(WITH COMPONENTS{authorizationValidationResponse PRESENT})})}
CaCertificateRequestMessage ::= EtsiTs103097Data-Signed
{EtsiTs102941Data(WITH COMPONENTS{..., content (WITH
COMPONENTS{caCertificateRequest PRESENT})})}
CaCertificateRekeyingMessage ::= EtsiTs103097Data-Signed {EtsiTs103097Data-
Signed {EtsiTs102941Data(WITH COMPONENTS{..., content (WITH
COMPONENTS{caCertificateRequest PRESENT})})}}
FetchUpdatesRequestMessaqe ::= EtsiTs103097Data-SignedAndEncrypted-
Unicast {EtsiTs102941Data (WITH COMPONENTS{..., content (WITH
COMPONENTS{fetchUpdatesRequest PRESENT})})}
FetchUpdatesResponseMessaqe ::= EtsiTs103097Data-SignedAndEncrypted-
Unicast {EtsiTs102941Data (WITH COMPONENTS{..., content (WITH
COMPONENTS{fetchUpdatesResponse PRESENT})})}
ReportAnomalyRequestMessaqe ::= EtsiTs103097Data-SignedAndEncrypted-
Unicast {EtsiTs102941Data (WITH COMPONENTS{..., content (WITH
COMPONENTS{reportAnomalyRequest PRESENT})})}
ReportAnomalyResponseMessaqe ::= EtsiTs103097Data-SignedAndEncrypted-
Unicast {EtsiTs102941Data (WITH COMPONENTS{..., content (WITH
COMPONENTS {reportAnomalyResponse PRESENT})})}
CRLadditionRequestMessaqe ::= EtsiTs103097Data-SignedAndEncrypted-
Unicast {EtsiTs102941Data (WITH COMPONENTS{..., content (WITH
COMPONENTS {cRLadditionRequest PRESENT})})}
InformEventMessaqe ::= EtsiTs103097Data-SignedAndEncrypted-Unicast
{EtsiTs102941Data (WITH COMPONENTS{..., content (WITH
COMPONENTS{informEvent PRESENT})})}
/************
-- EtsiTs102941Data
************/
EtsiTs102941Data::= SEQUENCE {
   version Version (v1),
   content EtsiTs102941DataContent
   }
EtsiTs102941DataContent ::= CHOICE {
   enrolmentRequest         InnerEcRequestSignedForPop,
   enrolmentResponse        InnerEcResponse,
   authorizationRequest     InnerAtRequest,
   authorizationResponse    InnerAtResponse,
```

TABLE 18-continued

Example ASN.1 definition of messages Fetch Updates Request, Inform Updates Server Event, Inform Anomaly Detection Server Event, and CRL Addition Request

```
    certificateRevocationList    ToBeSignedCrl,
    certificateTrustListTlm      ToBeSignedTlmCtl,
    certificateTrustListRca      ToBeSignedRcaCtl,
    authorizationValidationRequest    AuthorizationValidationRequest,
    authorizationValidationResponse   AuthorizationValidationResponse,
    caCertificateRequest         CaCertificateRequest,
    ...,
    fetchUpdatesRequest      InnerFetchUpdatesRequest,
    fetchUpdatesResponse     InnerFetchUpdatesResponse,
    reportAnomalyRequest     InnerReportAnomalyRequest,
    reportAnomalyResponse    InnerReportAnomalyResponse,
    cRLadditionRequest       InnerCRLadditionRequest,
    informEvent              InnerInformEvent
    }
END
InnerFetchUpdatesRequest ::= SEQUENCE {
    UpdatesclientId     OCTET STRING,
    itsId         OCTET STRING OPTIONAL,
    ... }
InnerFetchUpdatesResponse ::= SEQUENCE {
    requestHash      OCTET STRING (SIZE(16)),
    responseCode     FetchUpdatesResponseCode,
    ... }
 )
FetchUpdatesResponseCode::= ENUMERATED {
    ok(0),
    cantparse, -- valid for any structure
    badcontenttype, -- not encrypted, not signed, not enrolmentrequest
    imnottherecipient, -- the "recipients" doesn't include me
    decryptionfailed, -- works for ECIES-HMAC and AES-CCM
    unknownits, -- can't retrieve the ITS from the itsId
    baditsstatus, -- revoked, not yet active
    incompleterequest, -- some elements are missing
    deniedpermissions, -- requested permissions are not granted
    deniedrequest, -- any other reason?
    ... }
InnerReportAnomalyRequest ::= SEQUENCE {
    anomalyDetectionClientId    OCTET STRING,
    itsId         OCTET STRING OPTIONAL,
    ... }
InnerReportAnomalyResponse ::= SEQUENCE {
    requestHash      OCTET STRING (SIZE(16)),
    responseCode     ReportAnomalyResponseCode,
    ... }
 )
ReportAnomalyResponseCode::= ENUMERATED {
    ok(0),
    cantparse, -- valid for any structure
    badcontenttype, -- not encrypted, not signed, not enrolmentrequest
    imnottherecipient, -- the "recipients" doesn't include me
    decryptionfailed, -- works for ECIES-HMAC and AES-CCM
    unknownits, -- can't retrieve the ITS from the itsId
    baditsstatus, -- revoked, not yet active
    incompleterequest, -- some elements are missing
    deniedpermissions, -- requested permissions are not granted
    deniedrequest, -- any other reason?
    ... }
InnercRLadditionRequest ::= SEQUENCE {
    itsId       OCTET STRING,
    ...}
InnerInformUpdatesServerEvent ::= SEQUENCE {
    updatesClientId     OCTET STRING,
    ... }
InnerInformAnomalyDetectionServerEvent ::= SEQUENCE {
    anomalyDetectionClientId    OCTET STRING,
    ... }
```

The invention claimed is:

1. A method at a computing system, the method comprising:
receiving at least one message at the computing system, the at least one message being one or both of:
an update status information message from an updates server; and
an anomaly detection status information message from an anomaly detection server;
determining, based on the receiving the at least one message, a dynamic cybersecurity posture indication for an intelligent transportation system entity;
providing the dynamic cybersecurity posture indication for the intelligent transportation system entity to an Enrolment Authority within the computing system, and
digitally signing the dynamic cybersecurity posture indication within the computing system,
wherein the signed dynamic cybersecurity posture indication is included in a certificate relating to the intelligent transportation system entity.

2. The method of claim 1, wherein the receiving the at least one message is based on a status request being sent to at least one of the updates server and the anomaly detection server.

3. The method of claim 1, wherein the computing system further:
receives a cybersecurity posture determination request from the Enrolment Authority, the cybersecurity posture determination request containing cybersecurity data about the intelligent transportation system entity; and
uses the cybersecurity data about the intelligent transportation system entity when determining the dynamic cybersecurity posture indication for the intelligent transportation system entity.

4. The method of claim 1, wherein the dynamic cybersecurity posture indication is one of:
a dynamic cybersecurity posture information;
an indication that no dynamic cybersecurity posture information can be provided;
an indication that a dynamic cybersecurity posture is too low for the intelligent transportation system.

5. The method of claim 4, wherein the dynamic cybersecurity posture information is one or more of: a timestamp field providing information on when the intelligent transportation system entity was last audited as being cybersecure; a timestamp field providing information a last connection date to the updates server; a timestamp field providing information on when the intelligent transportation system entity last connected to an anomaly detection server; an indication of known vulnerabilities that the intelligent transportation system entity has mitigated against; a cybersecurity posture level; a hardware version or build for the intelligent transportation system entity; a software version or build for the intelligent transportation system entity; a cybersecurity posture score; and a vulnerability score.

6. The method of claim 4, wherein the indication that no dynamic cybersecurity posture information can be provided comprises an information element or a field within an information element.

7. The method of claim 4, wherein the indication that a dynamic cybersecurity posture is too low for the intelligent transportation system comprises an information element or a field within an information element.

8. The method of claim 1, further comprising:
receiving an information message at the computing system, the information message being from one of the updates server and the anomaly detection server indicating that an event has occurred for the intelligent transportation system entity; and
based on the receiving the information message, sending a Certificate revocation list addition request to a certificate authority for the intelligent transportation system entity.

9. The method of claim 8, wherein the computing system, prior to sending the certificate revocation list addition request, determines one or more identifiers for the intelligent transportation system entity based on a client identifier received in the information message.

10. The method of claim 9, wherein the one or more identifiers is a canonical identifier for the intelligent transportation system entity.

11. A network element comprising:
A hardware processor; and
a communications subsystem,
wherein the network element is configured to:
receive at least one message at the network element, the at least one message being one or both of:
an update status information message from an updates server; and
an anomaly detection status information message from anomaly detection server;
determine, based on the receipt the at least one message, a dynamic cybersecurity posture indication for an intelligent transportation system entity;
provide the dynamic cybersecurity posture indication for the intelligent transportation system entity to an Enrolment Authority at the network element;
digitally sign the dynamic cybersecurity posture indication at the network element,
wherein the dynamic cybersecurity posture indication is included in a certificate relating to the intelligent transportation system entity.

12. The network element of claim 11, wherein the network element is configured to receive the at least one message based on a status request being sent to at least one of the updates server and the anomaly detection server.

13. The network element of claim 11, wherein the network element is further configured to:
receive a cybersecurity posture determination request from the Enrolment Authority, the cybersecurity posture determination request containing cybersecurity data about the intelligent transportation system entity; and
use the cybersecurity data about the intelligent transportation system entity when determining the dynamic cybersecurity posture indication for the intelligent transportation system entity.

14. The network element of claim 11, wherein the dynamic cybersecurity posture indication is one of:
a dynamic cybersecurity posture information;
an indication that no dynamic cybersecurity posture information can be provided;
an indication that a dynamic cybersecurity posture is too low for the intelligent transportation system.

15. The network element of claim 14, wherein the dynamic cybersecurity posture information is one or more of: a timestamp field providing information on when the intelligent transportation system entity was last audited as being cybersecure; a timestamp field providing information a last connection date to the updates server; a timestamp field providing information on when the intelligent transportation system entity last connected to an anomaly detection server; an indication of known vulnerabilities that the intelligent transportation system entity has mitigated against; a cybersecurity posture level; a hardware version or build for the intelligent transportation system entity; a software version or build for the intelligent transportation system entity; a cybersecurity posture score; and a vulnerability score.

16. The network element of claim 14, wherein the indication that no dynamic cybersecurity posture information can be provided comprises an information element or a field within an information element.

17. The network element of claim 14, wherein the indication that a dynamic cybersecurity posture is too low for the intelligent transportation system comprises an information element or a field within an information element.

18. The network element of claim 11, wherein the network element is further configured to:
  receive an information message at the network element, the information message being from one of the updates server and the anomaly detection server indicating that an event has occurred for the intelligent transportation system entity; and
  based on the receipt of the information message, send a Certificate revocation list addition request to a certificate authority for the intelligent transportation system entity.

19. The network element of claim 18, wherein the network entity, prior to sending the certificate revocation list addition request, is configured to determine one or more identifiers for the intelligent transportation system entity based on a client identifier received in the information message.

20. The network element of claim 19, wherein the one or more identifiers is a canonical identifier for the intelligent transportation system entity.

21. A non-transitory computer readable medium for storing instruction code which, when executed by a processor of a network element cause the network element to:
  receive at least one message at the network element, the at least one message being one or both of:
    an update status information message from an updates server; and
    an anomaly detection status information message from anomaly detection server;
  determine, based on the receipt the at least one message, a dynamic cybersecurity posture indication for an intelligent transportation system entity;
  provide the dynamic cybersecurity posture indication for the intelligent transportation system entity to an Enrolment Authority at the network element; and
  digitally sign the dynamic cybersecurity posture indication at the network element,
  wherein the dynamic cybersecurity posture indication is included in a certificate relating to the intelligent transportation system entity.

* * * * *